(12) United States Patent
Christoffersen et al.

(10) Patent No.: US 6,892,002 B2
(45) Date of Patent: May 10, 2005

(54) STACKED PLANAR INTEGRATED OPTICS AND TOOL FOR FABRICATING SAME

(75) Inventors: Lasse Wengel Christoffersen, Soborg (DK); Bjarke Rose, Allerod (DK); Per Eld Ibsen, Kobenhavn N (DK)

(73) Assignee: Ibsen Photonics A/S, Farum (DK)

( * ) Notice: Subject to any disclaimer, the term of this patent is extended or adjusted under 35 U.S.C. 154(b) by 0 days.

(21) Appl. No.: 09/821,335

(22) Filed: Mar. 29, 2001

(65) Prior Publication Data

US 2002/0141062 A1 Oct. 3, 2002

(51) Int. Cl.[7] .................................................. G02B 6/26
(52) U.S. Cl. ........................... 385/39; 385/14; 385/49; 385/88; 385/131; 385/129; 359/566; 359/558
(58) Field of Search .............................. 359/566, 558; 385/14, 49, 88, 129–131, 37

(56) References Cited

U.S. PATENT DOCUMENTS

| | | |
|---|---|---|
| 5,051,340 A | 9/1991 | Tyan et al. |
| 5,321,498 A | 6/1994 | Song et al. |
| 5,390,050 A | 2/1995 | Yanagi et al. |
| 5,728,324 A | 3/1998 | Welch et al. |
| 5,771,218 A | 6/1998 | Feldman et al. |
| 5,825,741 A | 10/1998 | Welch et al. |
| 5,938,989 A | 8/1999 | Hambright |
| 6,021,106 A | 2/2000 | Welch et al. |
| 6,061,169 A | 5/2000 | Feldman et al. |
| 6,684,010 B1 * | 1/2004 | Morris et al. ............. 385/39 |

FOREIGN PATENT DOCUMENTS

| | | |
|---|---|---|
| EP | 0671653 A1 | 9/1995 |
| EP | 0869312 A2 | 10/1998 |
| JP | 03155921 | 7/1991 |
| JP | 2001047523 | 2/2001 |
| WO | WO 97/10527 | 3/1997 |
| WO | WO 97/00980 | 9/1997 |

OTHER PUBLICATIONS

Garner et al., "Three–Dimensional Integrated Optics Using Polymers", IEEE Journal of Quantum Electronics, vol. 35, No. 8, Aug., 1999.
International Search Report for PCT/IB02/02204.
Herzig, Hans Peter, "Micro–optics Elements, systems and applications," Institute of Microtechnology, University of Neuchatel, Switzerland, Taylor & Francis, 1997.
Dam–Hansen, Carsten et al., "Replication of microoptics," Kamstrup A/S, Industrivej 28, Stilling, DK–8660 Skanderborg, Denmark, Optics and Fluid Dynamics Department, Riso National Laboratory, DK–4000 Roskilde, Oct., 2000, pp. 18–21.
Lindvold, Lars, et. al., "Mass Fabrication of Diffractive Optics Using Compact Disc Technology," Department of Optics and Fluid Dynamics, Riso National Laboratory, Post Box 49, DK–4000 Roskilde, Oct., 1997, pp. 1–9, (in Danish, English translation supplied in earlier filed IDS ).

(Continued)

Primary Examiner—Fayez G. Assaf
(74) Attorney, Agent, or Firm—Altera Law Group, LLC

(57) ABSTRACT

In a method of making a replication tool, replication parts for both two dimensional optical elements, such as are fabricated using micro-forming techniques, and three dimensional optical elements, that are typically formed using cutting techniques are present on the replication tool. A method of manufacturing a replication tool for a planar optical sheet includes mounting at least one optical element part on a base to form a master part and forming a conductive metal layer over the master part. The method also comprises electrochemically depositing over the conductive metal layer to form an electrochemically deposited layer, separating the electrochemically deposited layer from the master part. The invention also relates to the replication tool itself and optical circuits formed using the replication tool.

37 Claims, 20 Drawing Sheets

OTHER PUBLICATIONS

Iga, Kenlchl, et al., "*Stacked Planar Optics: An application of the planar microlens,*" Applied Optics, vol. 21, No. 19, Oct. 1, 1982.

"*Quick Assemble Small Diameter Two Channel Optical Encoder,*" Technical Data, 1998 Hewlett Packard Company, pp. 1–8.

Tang, Peter Torben, "*Fabrication of Micro Components by Electrochemical Deposition,*" Ph. D. Disseration pp. 10–15, Technical University of Denmark, Mar. 1, 1998.

Rose, Bjarke et al., "*Wavelength Division Multiplexed Device,*" U.S. Appl. No. 09/790,144, filed with the USPTO on Feb. 21, 2001.

Holm, Christen Johan et al., "*Grating Structures and Methods of Making the Grating,*" U.S. Appl. No. 09/789,888 filed with the USPTO on Feb. 21, 2001.

\* cited by examiner

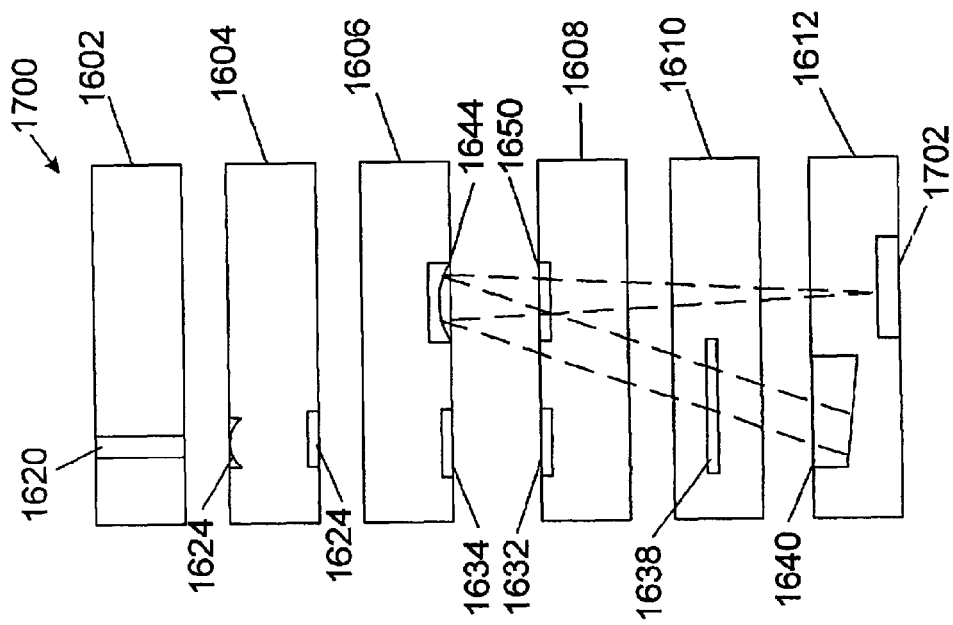
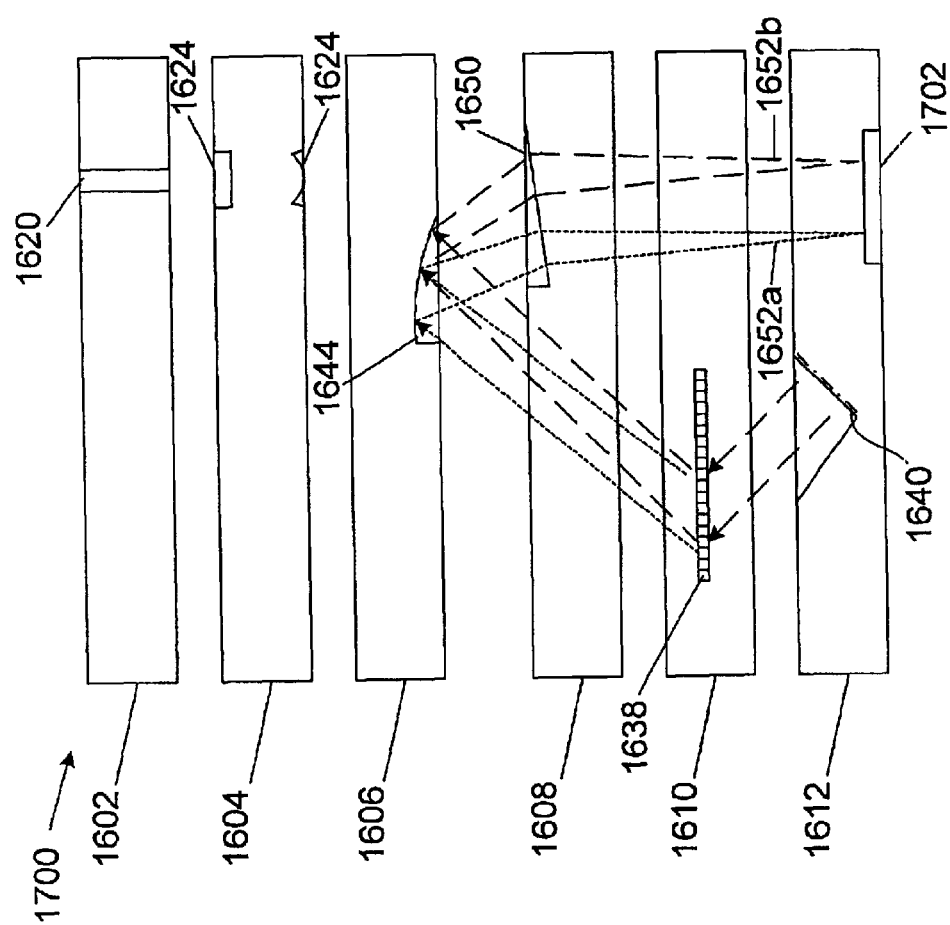
FIG. 17A
FIG. 17B ized dimensions of only a few microns with optical elements having vertical dimensions that are significantly larger. There is also a need for a method that permits the combination of different optical components fabricated from different processes. For example, there is a need to be able to combine discrete optical elements with replicated optical elements.

STACKED PLANAR INTEGRATED OPTICS AND TOOL FOR FABRICATING SAME

FIELD OF THE INVENTION

The present invention is directed generally to optical systems and more particularly to an approach to manufacturing optical systems formed from stacked optical elements.

BACKGROUND

Optical circuits that are formed by stacking a number of planar optical sheets have several advantages, including small size. Furthermore, since the optical sheets are formed by replication, the cost of producing high numbers of planar optical sheets can be low.

Different methods of making replication tools, that achieve the required levels of positional and orientational accuracy, have been used, including micro-forming and cutting. In micro-forming, structures are defined by scanning an intensity-modulated beam, by mask-based lithography, or by interference of coherent electromagnetic radiation. The structures can be realised by radiation-induced changes of chemical bonds or local energy states in photo-resist, resin or a material which acts as the optical material. The exposure is followed by one or several post-treatment stages, for example development processes, heat treatments, and mass-increasing (additive) or mass-reducing processes, such as etching. Micro-forming processes are particularly suitable for manufacturing "planar" microstructures, which have features that extend out of the plane by only few microns, typically less than 10 microns. One important example of such a planar structure is a diffractive grating, whose period and feature depth is typically of the order of 1 $\mu$m, which may be produced by laser interference exposure of photo-resist on a silica support, followed by development and pattern transfer by anisotropic etching, such as reactive ion etching (RIE). Although micro-forming processes are well suited for making small features, of the order of 1 $\mu$m and smaller, these methods are not well suited to making features having vertical dimensions much larger than about 10 $\mu$m, since they require the growth and/or etching of a significant amount of material.

Cutting processes include single point diamond turning, micro-milling, grinding and polishing. Cutting processes are suitable for manufacturing three-dimensional elements with high spatial accuracy and surface smoothness. An important example is refractive lenses, typically having a depth and width of 0.1 mm to 10 mm or more, produced by grinding and polishing, or single point diamond turning. Cutting processes are well suited to removing large amounts of material, but are less well suited to making fine features in the 1 $\mu$m range.

SUMMARY OF THE INVENTION

The two methods discussed above, for making replication tools are each well suited to making features in different size ranges. There has been, however, little development of stacked optical circuits that combine refractive, reflective or transmissive optical elements, which typically have a vertical dimension around 100 $\mu$m or higher, and are formed by some kind of cutting technique, with elements, such as diffractive or micro-refractive elements, typically having a vertical dimension of 10 $\mu$m or less, that are formed using a micro-formed technique. The manufacturing of master arrays has so far been limited to either refractive/reflective elements formed by cutting processes, or diffractive and micro-refractive structures formed by micro-machining processes. There is, therefore, a need for the monolithic combination of optical elements having vertical dimensions of only a few microns with optical elements having vertical dimensions that are significantly larger. There is also a need for a method that permits the combination of different optical components fabricated from different processes. For example, there is a need to be able to combine discrete optical elements with replicated optical elements.

Generally, the present invention relates to a method of making a replication tool that includes replication parts for both two dimensional optical elements, such as are fabricated using micro-forming techniques, and three dimensional optical elements, that are typically formed using cutting techniques. The invention also relates to stacked optical circuits fabricated using such a process.

One embodiment of the present invention relates to a method of manufacturing a replication tool for a planar optical sheet. The method comprises mounting at least one optical element part on a base to form a master part and forming a conductive metal layer over the master part. The method also comprises electrochemically depositing over the conductive metal layer to form an electrochemically deposited layer, separating the electrochemically deposited layer from the master part.

Another embodiment of the invention is directed to a former for making a replication tool for optical sheets. The former includes a base, at least one optical element part mounted on the base, and a conductive coating covering the at least one optical element part and at least a portion of the base.

Another embodiment of the invention is directed to a replication tool for replicating optical sheets. The replication tool includes a replicating surface that has at least a replication part for a micro-structured optical element and a replication part for a non-micro-structured optical element.

Another embodiment of the invention is directed to a replication tool for replicating optical sheets. The replication tool includes a replicating surface that has at least a base replication part, a first replication part for a first optical element and a second replication part for a second optical element. The first replication part has a dimension perpendicular to the base replication part of more than 100 $\mu$m.

Another embodiment of the invention is directed to an optical system having a stack of at least two optical sheets. At least one of the optical sheets has a surface replicated with a micro-structured optical element and at least one non-micro-structured optical element.

Another embodiment of the present invention is directed to an optical system that has a plurality of stacked optical sheets, each of the stacked optical sheets including at least one optical element replicated on a surface to define the optical circuit. An optical path through the optical circuit passes from a first optical element on a first optical sheet of the plurality of stacked optical sheets to a first optical element on a second optical sheet of the plurality of stacked optical sheets and to a second optical element on the first optical sheet.

Another embodiment of the invention is directed to a method of making an optical system. The method includes making one or more replication tools having respective replication surfaces by a) mounting at least one optical element part on a base to form a master part, b) forming a conductive metal layer over the master part, c) electrochemically depositing over the conductive metal layer to form an electrochemically deposited layer, and d) separating the electrochemically deposited layer from the master part and exposing the replication surface. The method also includes replicating optical elements on optical sheets using the one or more replication tools, stacking replicated optical sheets to form a stack, and separating optical system cells from the stack.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIGS. 17A and 17B schematically illustrate an embodiment of a channel monitor that uses a transmissive diffractive optical element according to the present invention;

Figure 1:
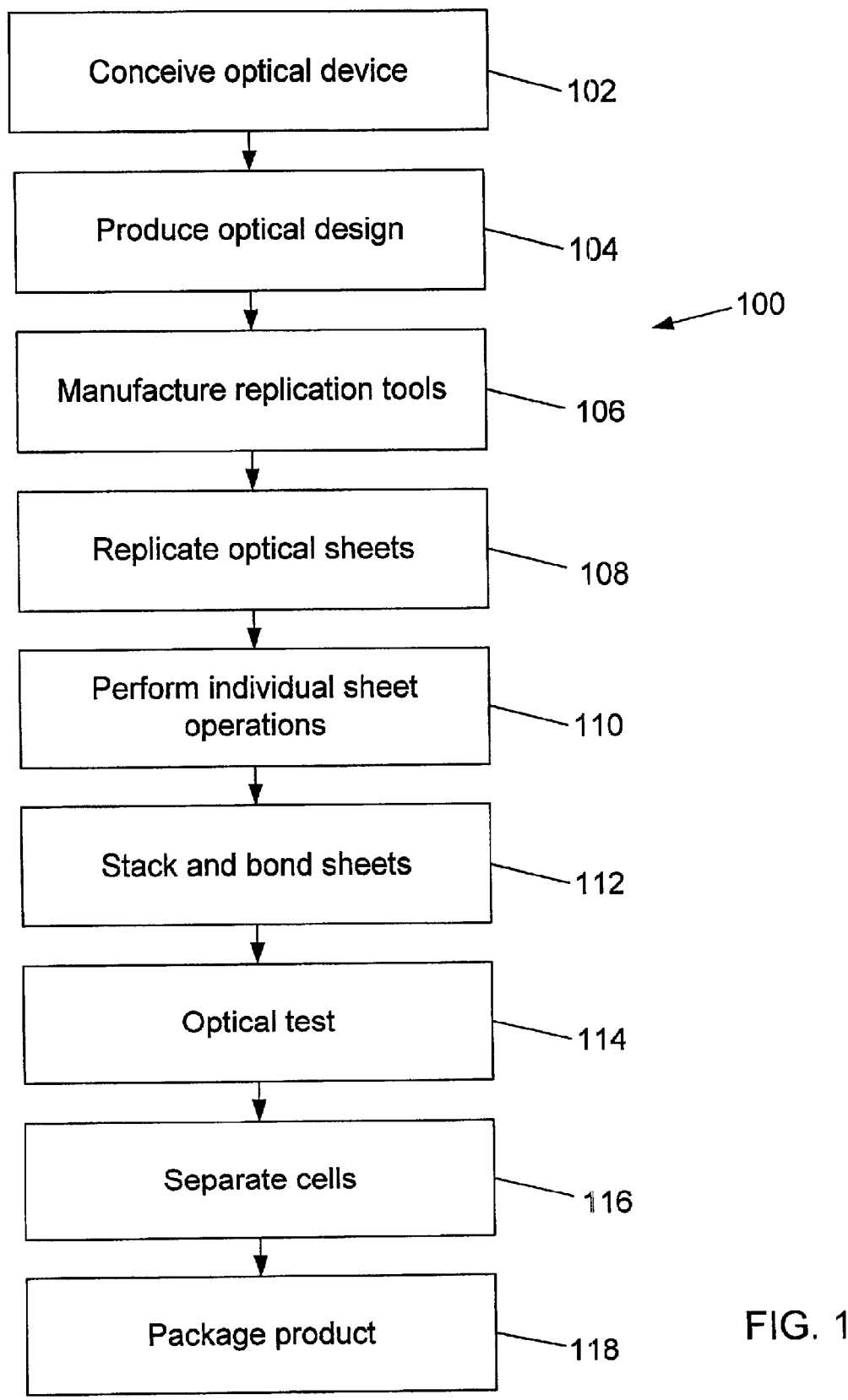
FIG. 1 lists process steps in forming integrated optical circuits.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

In general, the present invention is directed to optical systems and more particularly to optical systems fabricated from a stack of planar segments, also referred to as optical sheets. The optical systems are formed from a number of passive and active components arranged in precise mutual positional and orientational relationship. The method of stacking planar segments, or optical sheets, is referred to as stacked planar integrated optics (SPIO).

A general manufacturing procedure 100 for SPIO is illustrated in FIG. 1, and various stages of the process are schematically illustrated in FIGS. 2A–2D. First, a draft optical device is conceived, at step 102, and the optical design is produced, at step 104. Replication tools are fabricated, at step 106. The replication tools may be used for replicating multiple copies of each optical sheet.

Figure 2A:
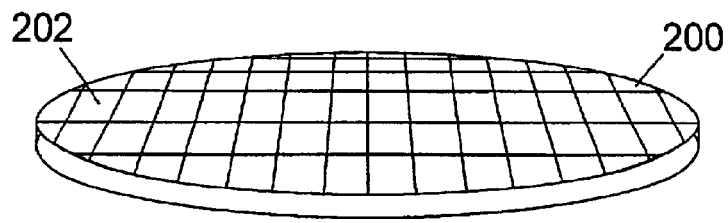
FIGS. 2A–2D schematically illustrate different stages of forming a stacked planar integrated optical circuit according to the process listed in FIG. 1.

Passive elements are produced as an array, confined in the optical sheets, by replication, step 108. Typically, a single replicated optical sheet 200 contains repeated sets of passive elements in an array of cells 202, as schematically illustrated in FIG. 2A. Each optical sheet includes arrays of elements oriented and arranged to match elements on other sheets.

The term replication refers to a group of processes where a molding tool leaves an imprint on a workable material, such as thermoplastic, resin, organically modified silicate (ormosil) or inorganic glass. Examples of replication processes include injection moulding, hot embossing, UV embossing and casting and curing.

Individual sheet operations are then performed, at step 110. These operations are typically unable to be performed using a replication process. For example, an individual sheet operation may include providing optical coatings on part or all of an optical sheet. In another example, active components or other passive components that cannot easily be replicated may be mounted on the optical sheet.

Figure 2B:
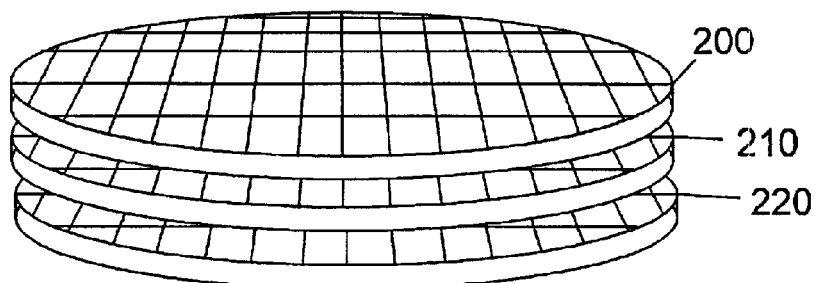

The optical sheets are stacked in alignment, at step 112, and bonded. A stack of three sheets 200, 210 and 220 is schematically illustrated in FIG. 2B, with cells 202 in the array of the upper sheet 200 corresponding to cells in the arrays of elements on the other sheets 210 and 220.

After the sheets are stacked, one or more of the individual cells may be tested at an optical probe station, at step 114, to determine that the replication and stacking processes have produced cells that operate in a satisfactory manner. Such testing may be carried out by transmitting one or more light beams into the cell being tested and measuring the optical response.

The optical sheets may be assembled together by, for example, electrochemical bonding between adjacent sheets. This approach typically results in the bond between optical sheets being of the same material the sheets themselves. The optical sheets may also be assembled by providing an adhesive between adjacent sheets, and pressing the sheets together. The adhesive may be provided along lines that will be cut in the subsequent separation step, so that the cut passes through the adhesive, thus leaving the adhesive around the perimeter of a separated, stacked cell. The stacked cell may consequently be sealed by bonding or through the use of adhesive.

Figure 2C:
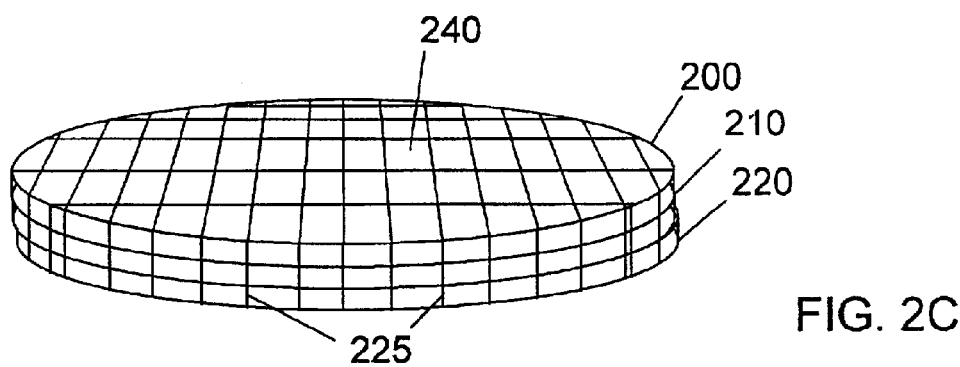
Figure 2D:
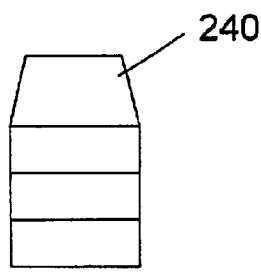

Once the stack has been successfully tested, the different cells in the stack may then be separated from the other cells, at step 116, for example using a slice and dice technique. FIG. 2C schematically illustrates the stacked sheets 200, 210 and 220 with cuts 225 through the sheets 200, 210 and 220. FIG. 2D schematically illustrates a single stacked cell 240 obtained from the stack shown in FIG. 2C. The individual stacked cells 240 are then packaged, at step 118, and the products are completed.

The stack may contain a variety of types of optical sheets, including replicated optical sheets, printed circuit boards with active elements and preprocessed semiconductor wafers, silicon or other semiconductor sheets that may be etched with selected patters, or sheets of inorganic material, such as fused silica, that may be provided with optical elements. The included replicated passive elements on the optical sheets may be refractive, diffractive, transmissive or reflective. The replicated optical sheets may also include structures that facilitate assembly of several layers, and in some cases mounts for sub-systems and elements that cannot be easily produced by replication, such as active elements, special passive elements, for example birefringent or polarization sensitive elements, and passive optical elements that are produced by micro-forming. For example, a passive element formed by micro-forming may be a bonded grating or a grating having a diffraction efficiency that is not polarization sensitive, as taught in U.S. patent application Ser. No. 09/789,888, entitled "Grating structures and Methods of Making the Grating Structures", filed on Feb. 21, 2001, by J. Holm, H. Madsen, S. Weichel, P. E. Ibsen and B. Rose, incorporated herein by reference. Furthermore, an optical sheet may be provided with micro-formed fiber alignment features, such as fiber channels, v-grooves and the like.

One of the advantages of SPIO is wafer-based hybrid production that combines both serial and parallel production and assembly methods. The components required for an optical circuit are integrated on multiple optical sheets that contain multiple optical elements, the optical sheets being stacked and then bonded together. The term "hybrid" refers to the fact that the different sheets forming the stack may include different types of technologies. For example, the optical sheets may include silicon based devices, such as photodiodes or photodiode arrays, or devices based on other types of semiconductor, such as GaAs or InP laser or LED devices. The optical sheets may also include silica wafers with waveguides. Polymer optical sheets may include replicated diffractive, refractive, reflective or transmissive elements. Optical sheets may also include surface mounted optical and electronic components.

Another advantage of the SPIO technique is that optical elements having very different scale dimensions may be replicated on the same surface. For example, an optical element that, if originally manufactured would be made using a micro-forming technique, may be replicated on the same surface as an optical element that, if originally manufactured would be made using a macroscopic cutting technique.

Micro-forming techniques typically involve scanning an intensity-modulated beam, for example optical mask-based lithography, or e-beam writing, or involve the use of coherent electromagnetic radiation, to expose a photoresist. This may be followed by one or several post-treatment stages, for example development processes, heat treatments, and mass-increasing, such as material growth, or mass-reducing processes, such as etching. Micro-forming techniques are widely used in the fabrication of, for example, semiconductor devices. Since material removal and addition techniques remove or add micro-forming techniques mass relatively slowly, micro-forming techniques are most suitable for manufacturing structures having a feature height of the order of 10 $\mu$m or less. Structures that are directly fabricated by micro-forming techniques are referred to herein as two-dimensional structures, since the extent in the third dimension, the height, is limited to around 10 $\mu$m or less. These structures may also be referred to as micro-structures. These may include diffractive elements, micro-channels and the like.

Macroscopic cutting techniques, for example diamond turning, micro-milling, grinding and polishing, are widely used for forming bulk optical components. These techniques can remove mass from a body relatively quickly, at least compared to micro-forming techniques, and are well suited to forming optical components having a vertical dimension in excess of 100 $\mu$m or more, for example more than 500 $\mu$m, or more than 1 mm, even though a polishing process may be able to produce a surface flatness measurable in fractions of a micron. Structures fabricated by macroscopic cutting processes are referred to herein as three-dimensional optical elements.

Figure 3A:
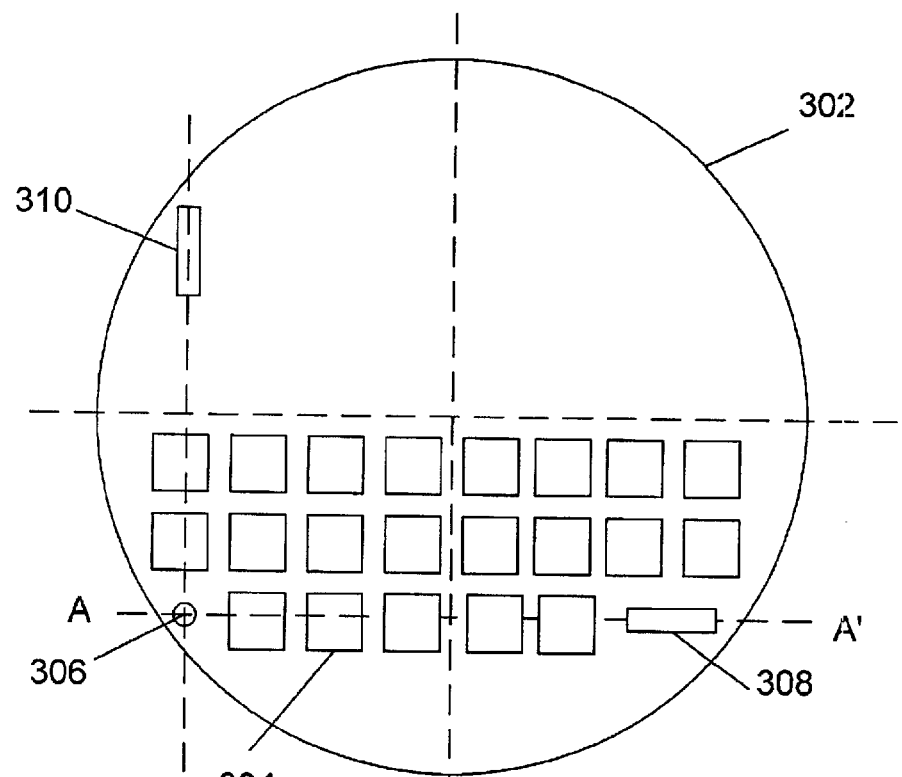
FIGS. 3A–3E schematically illustrate methods of aligning different optical sheets according to the present invention.
Figure 3B:
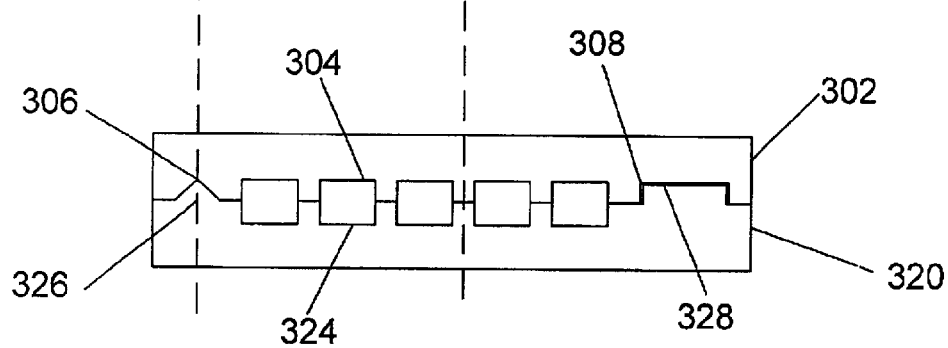

Another advantage of SPIO is that production and alignment are performed in parallel. One approach to aligning adjacent optical sheets in the stack is schematically illustrated in FIGS. 3A and 3B. In FIG. 3A, a plan view of an optical sheet 302 is illustrated, showing the individual cells 304. Alignment features 306, 308 and 310 are provided on the under-side of the optical sheet 302, and mate with corresponding features on the adjacent optical sheet 320. A cross-sectional view of the optical sheet 302 and its adjacent neighbor sheet 320, along the section AA', is presented in FIG. 3B. In this embodiment, the alignment features 306 and 308 on sheet 302 are female features that mate with corresponding male features 326 and 328 on sheet 320. The alignment features 306, 308, 310, 326 and 328 maybe formed with any suitable cross-sectional shape, for example conical, triangular, rectangular, square, or the like. Adjacent sheets are provided with complementary alignment features so that adjacent sheets are aligned with respect to each other both translationally and orientationally. It will be appreciated that each sheet may be provided with a mixture of male and female alignment features, and each sheet need not have only one gender of alignment features. It will further be appreciated that the optical sheet 302 may be provided with alignment features on its upper surface for aligning with another optical sheet.

The alignment and clamping that is needed during sheet coating processes can be facilitated by fitting the mechanical alignment structures 306, 308, 310, 326 and 328 into mating structures on the coating application apparatus or coating masks. Likewise other individual sheets operations, such as mounting of discrete components or machining of secondary alignment structures, can utilize the alignment structures 306, 308, 310, 326 and 328.

Figure 3C:
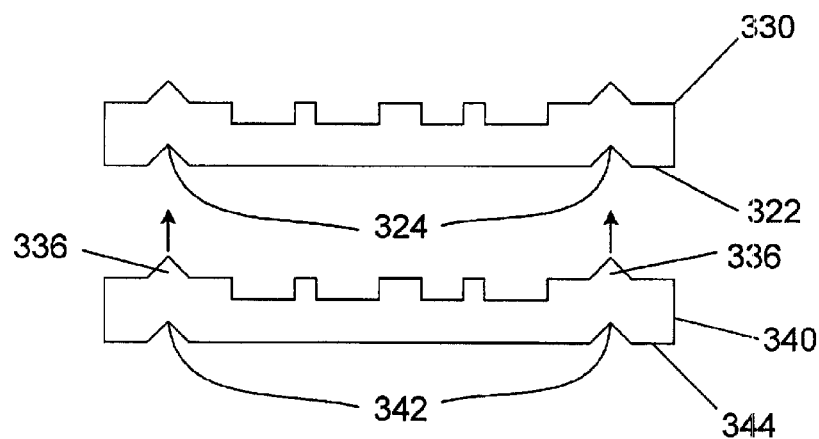
Figure 3D:
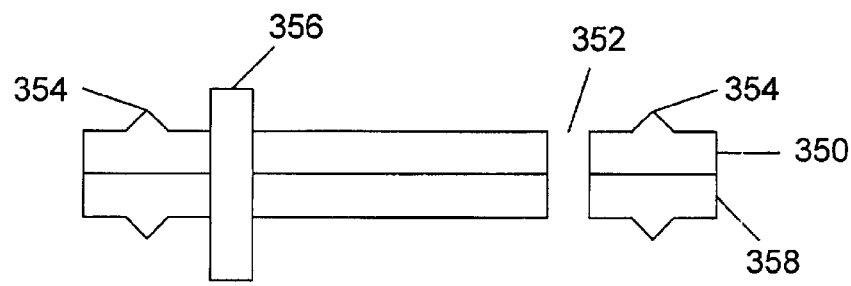
Figure 3E:
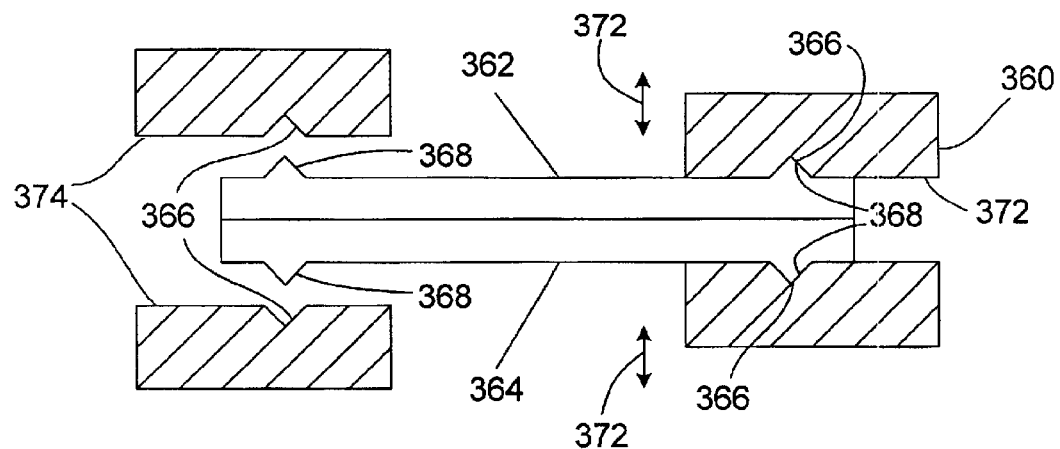

Other approaches to aligning the optical sheets, particularly optical sheets with a single replicated surface are illustrated in FIGS. 3C–3E. Layers produced by single sided replication may be joined without direct contact between mating alignment structures of one sheet 320 and another sheet 302. For example, as is schematically illustrated in FIG. 3C, secondary alignment structures 334 may be machined on the backside 332 of a single side replicated sheet 330. The secondary alignment structures 334 then mate with primary alignment structures 336 provided on the upper surface 338 of a second sheet 340. The primary alignment structures may be replicated on the second sheet 340.

Secondary alignment structures 342 may also be provided on the backside 344 of the second optical sheet 340 for alignment with a third optical sheet (not shown). The use of machined secondary alignment structures permits a large number of single sided optical sheets to be stacked together.

Another approach to stacking single sided optical sheets is illustrated in FIG. 3D. An optical sheet 350 may be provided with one or more through holes 352. Where the optical sheet 350 is formed from an organic polymer, the through holes 352 may be formed by replication. Where the optical sheet is formed from a material which does not readily form a through hole, for example a resin solidified on an inorganic substrate, the through holes 352 may be machined during the post-replication, individual sheet operations. Advantageously, the process for machining the holes 352 may use the replicated alignment structures 354 for mating with complementary mating structures on the machining tool. Thus, the optical sheet 350 may self-align with the machining tool for forming the hole 352. A guide pin 356 placed through the hole 352 may be used to align the optical sheet 350 with one or more other optical sheets 358 sheets.

Another approach to aligning single-sided optical sheets is illustrated in FIG. 3E. A device 360 for holding two or more optical sheets 362, 364 includes complementary structures 366 for mating to the alignment structures on 368 optical sheets 362, 364. The device 360 may be used to facilitate fixation, alignment and bonding and/or gluing of the optical sheets 362, 364. The fixation and release of the optical sheets 362, 364 is accomplished by moving the clamping surfaces 370, that include the complementary structures 366, in the directions of the arrows 372. The movement of the clamping surfaces 370 is typically carried out in such a way that the end position of the movement, in the clamped position, is precisely defined. Clamping surfaces 374 are shown in a retracted, unclamped position.

The methods described above for aligning respective optical sheets provide many possibilities for optimizing the shape and size of the alignment structures. Thus, the optical sheets, that have been produced by different processes, may be aligned and assembled. For example, holes may be drilled at locations with high precision on printed circuit boards. Monocrystalline silicon wafers may be anisotropically etched to produce v-grooves. Printed circuit boards and etched silicon layers may can be aligned and bonded to a replicated optical sheets using one of the methods described with reference to FIGS. 3A–3E.

Active alignment may also be used when aligning one optical sheet relative to another. In active alignment, an optical signal passes through the optical sheets and one sheet is translated and/or rotated relative to another sheet depending upon the optical signal. Adjustment with a mask aligner is an example of such an approach. Suitable alignment marks on the optical sheets are used to provide reference of the position of the sheet. Another approach is to detect and interpret an image that is formed by light travelling through the functional optical elements.

Figure 4A:
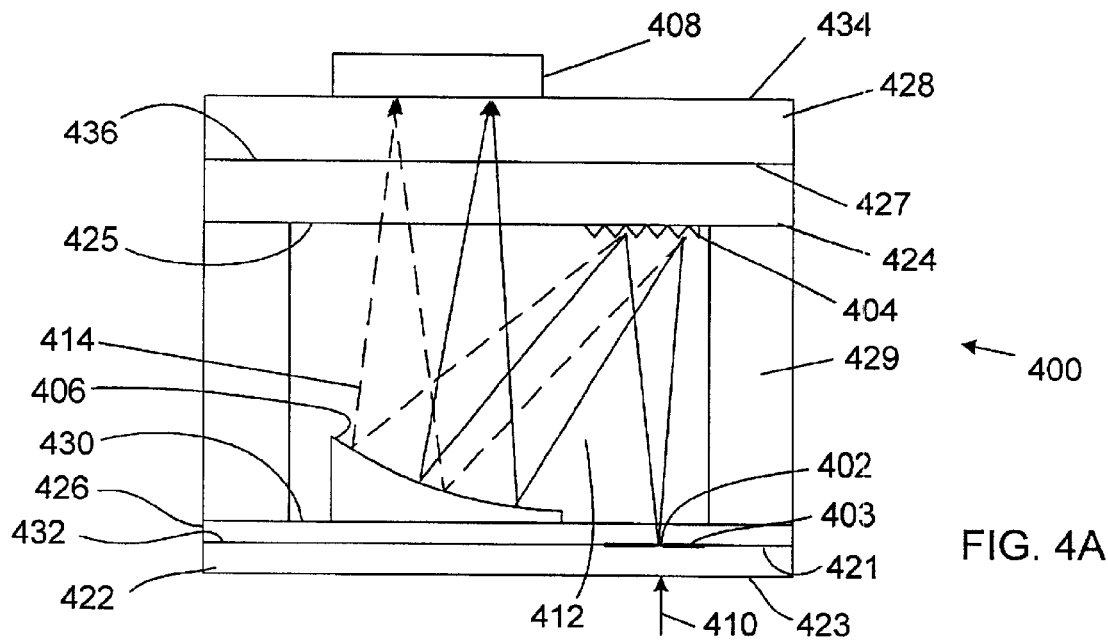
FIGS. 4A–4C schematically illustrate different approaches to forming a spectrometer stacked planar integrated optical circuit according to the present invention.
Figure 4B:
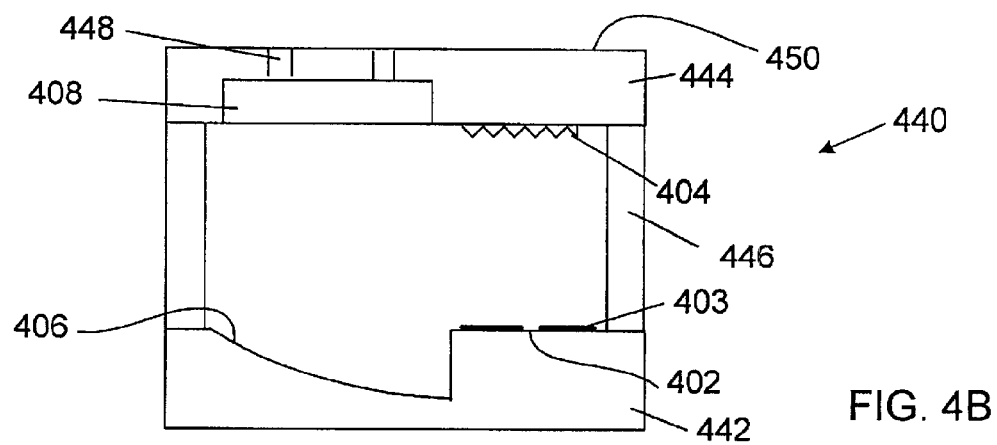
Figure 4C:
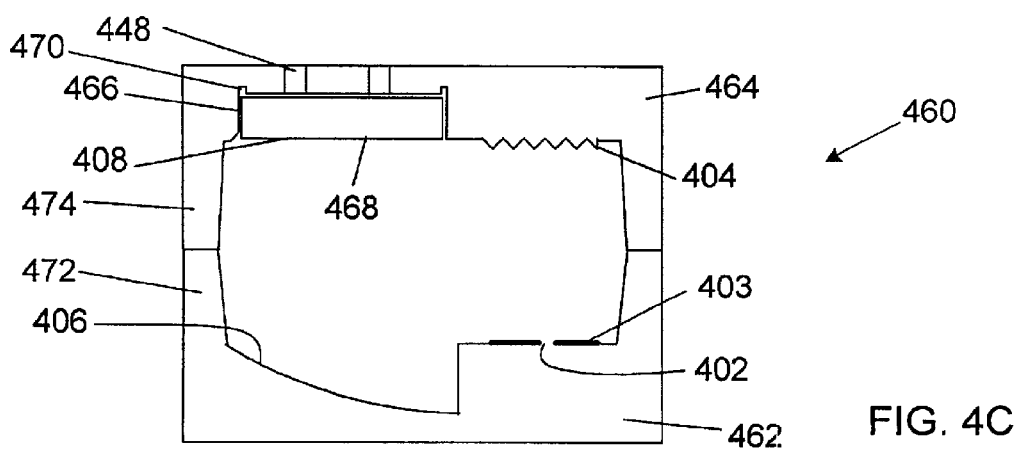

Different approaches to forming an optical circuit are illustrated in FIGS. 4A–4C. The particular optical circuit illustrated is a spectrometer, although it will become clear to the reader that the approaches described with respect to FIGS. 4A–4C are applicable to many different types of optical circuit that may use optical elements that are different from those used in the spectrometer.

The embodiment of the spectrometer 400 illustrated in FIG. 4A is based on four optical elements, three of which are passive and one of which is active. The three passive elements are an aperture 402, which may be a slit; a diffraction element 404, which may be a diffraction grating; and a focusing element 406, which may be a curved mirror.

The active element is a detector 408, which may be, for example, a photodetector array such as a photodiode array or a charge coupled device (CCD) array. Light 410 passes through the aperture 402 to the diffraction element 404. Light 412 and 414 is diffracted from the diffraction element 404 to the focusing element 406. Light at longer wavelengths 414 (dashed lines) is diffracted through a larger angle than light 412 at shorter wavelengths (solid lines). Thus, the diffraction element 404 spatially separates different wavelength components of the incident light 410. The different wavelength components 412 and 414 are focused to different positions on the detector 408 by the focusing element 406.

In this particular embodiment 400, each optical element is disposed on a separate optical sheet. The optical sheets are typically formed from any suitable transparent material, for example polymers, such as polycarbonate, polymethylmethacrylate, cyclo-olefin copolymer, or resins solidified on inorganic substrates, for example EPO-TEK 301 (Epoxy Technology, USA) on silica, and inorganic moldable glasses, for example a silicate glass such as BK7, available from Schott, Germany.

Thermoplastic polymers are particularly suitable where the sheets are replicated using, for example, an embossing or molding technique. The aperture 402 is disposed on a first optical sheet 422, the diffracting element 404 is disposed on a second optical sheet 424, the focusing element 406 is disposed on a third optical sheet 426 and the detector 408 is disposed on a fourth optical sheet 428. A spacer 429 separates the second and third optical sheets 424 and 426 to provide sufficient distance between the focusing element 406 and both the diffraction element 404 and the detector 408.

The aperture 402 may be formed in an opaque coating 403 on the first optical sheet 422, for example an absorbing coating. The absorbing coating may be applied using a printing technique. The opaque coating 403 may be formed on the upper surface 421 or the lower surface 423 of the first optical sheet 422.

The diffraction element 404 may be molded on the lower surface 425 of the second sheet 424, although it may also be molded on the upper surface 436 of the second sheet 424. In this particular embodiment, the diffraction element 404 operates n reflection, and so the diffraction element 404 is typically provided with a reflective coating, for example a metal coating or a reflective dielectric coating.

The focusing element 406 may be molded on the upper surface 430 of the third optical sheet 426, although the focusing element may also be molded on the lower surface 432 of the third optical sheet. In this particular embodiment 400, the focusing element 406 is a curved mirror, so the mirror surface is provided with a reflective coating, for example a metallic coating or a multilayer dielectric coating.

The detector 40B may be placed on the upper surface 434 of the fourth optical sheet 428. The detector 408 may also be placed in a well extending into the fourth optical sheet 428 from the upper surface 434 or in a well extending into the fourth optical sheet 428 from the lower surface 436. Conduits may be provided through the fourth optical sheet 428 when the detector 408 is positioned in a well extending from the lower surface 436 of the fourth optical sheet, to provide for electrical connection to the detector 408.

Another embodiment 440 of a SPIO spectrometer is schematically illustrated in FIG. 4B. In this embodiment, the aperture 402 and focusing element 406 are provided on the lower optical sheet 442, and the diffraction element 404 and the detector 408 are provided on the upper optical sheet 444. A separate spacer 446 is disposed between the optical sheets 442 and 444 to provide the appropriate separation distance between the optical elements 402, 404, 406 and 408. The spacer may be hollow, as shown, so that there is air between the optical sheets 442 and 444, or may be solid.

The upper sheet 444 may be provided with conduits 448 to provide electrical access to the detector 408 from the upper surface 450 of the upper sheet 444.

Another embodiment 460 of a SPIO spectrometer is schematically illustrated in FIG. 4C. In this embodiment, the aperture 402 and focusing element 406 are provided on the lower optical sheet 462, and the diffraction element 404 and the detector 408 are provided on the upper optical sheet 464. The optical sheets 462 and 464 are each provided with respective integrated spacers 472 and 474 which, when the optical sheets 462 and 464 are stacked together, ensure the correct stand-off distance for the optical elements 402, 404, 406 and 408.

It will be appreciated that although the two optical sheets 462 and 464 may each be provided with integrated spacers 472 and 474 of the same size, this need not be the case. For example, the integrated spacers 472 and 474 may each provide different stand-off distances. Furthermore, only one of the optical sheets may be provided with an integrated spacer that provides the desired stand-off distance.

The well 466 in the upper sheet 464 is made to be sufficiently deep so that the operative surface 468 of the detector 408 is at the desired position relative to the focusing element 406. Conduits 448 may be provided to allow electrical access to the back of the detector 408. The well 466 may be provided with relief grooves 470 around the corners to ensure there is no material left at the corners of the well 466 to prevent the detector 408 from being positioned in the well at the desired position and orientation. The well 466 may be several mm deep.

If it is difficult to manufacture a replication tool that includes replicated spacers having a height above a few mm, then it may be preferable to use separate spacers when the desired separation between optical sheets is more than a few mm, for example spacer 446. Separate spacers may be formed from, inter alia, tubes and perforated sheets. Tubes of aluminum or glass fiber-reinforced polymer are widely available. Perforated sheets are typically machined according to specific demand.

One of the important features of the invention, illustrated in FIGS. 4B and 4C, is that a two-dimensional optical element, for example the grating 404, may be replicated on the same surface of an optical sheet as a three dimensional optical element having a depth that is orders of magnitude different from that of the two dimensional optical element. For example, a diffractive element is considered to be a two dimensional element and typically has features that are less than 10 $\mu$m in height, and often are less than 5 $\mu$m in height. On the other hand, other optical elements provided on the same sheet surface, such as the well for the detector, or other types of optical element as may be discussed herein, may have heights that exceed 100 $\mu$m, 500 $\mu$m or even 1 mm. Thus, the technique of the present invention permits elements having feature heights of less than about 10 $\mu$m to be replicated on the same surface as elements having feature heights much larger, say more than 100 $\mu$m, 500 $\mu$m or even 1 mm.

Figure 5:
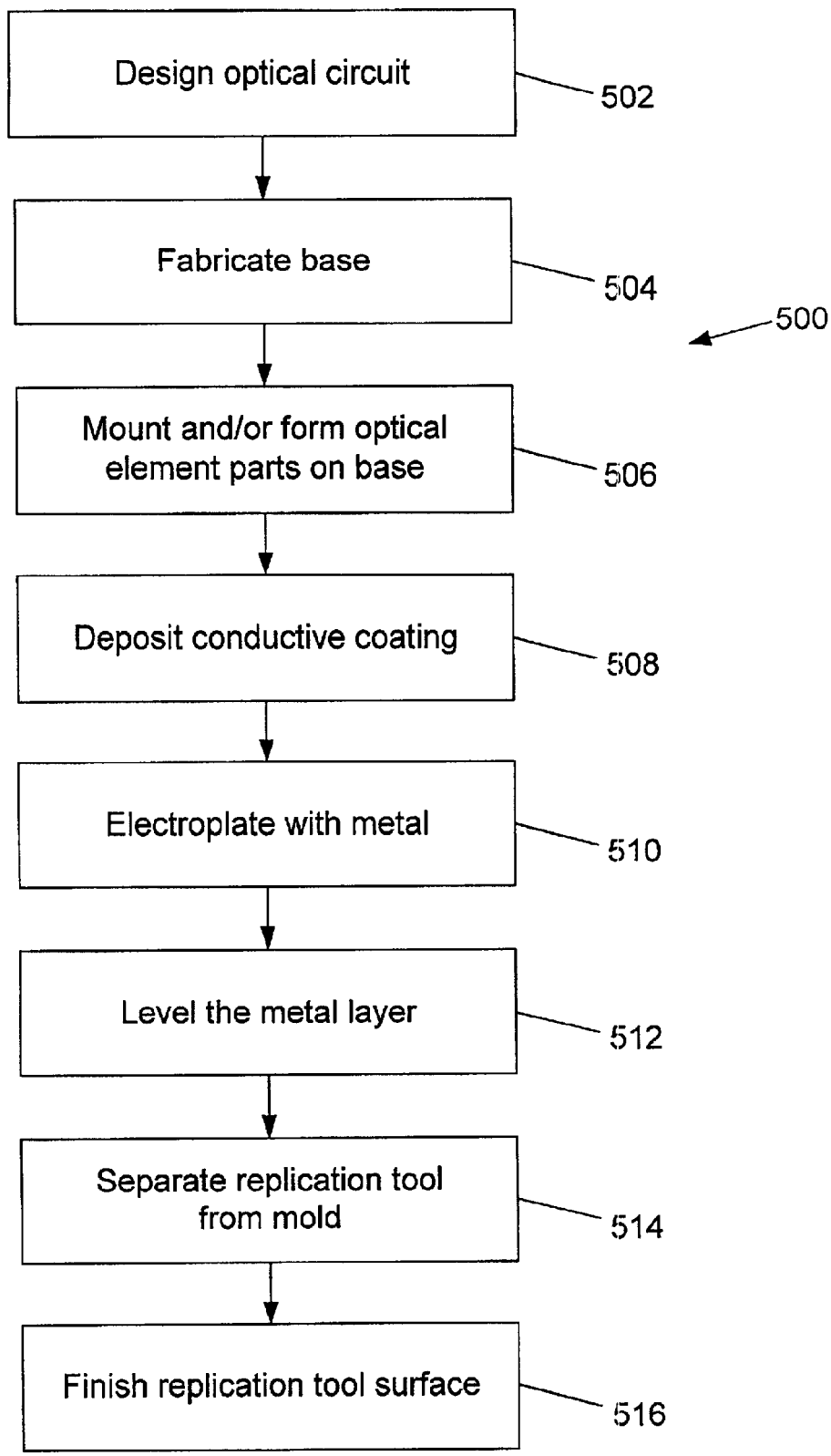
FIG. 5 lists process steps in forming a replication tool according to the present invention.

An embodiment of a method 500 that may be used to make a replication tool for replicating optical sheets is illustrated in FIG. 5, and is described with reference also to FIGS. 6 and 7. First, the desired optical circuit is designed, at step 502. This may include generating specifications on each component or mount on a sheet, including specifications for the component or mount itself, such as geometrical dimensions, the identification number on the layer in which the component is disposed, the position and orientation of the component or mount with respect to the layer and specifications on a possible coating on the final replicated component.

The whole layer, which may be produced by replication using a single tool, can contain components for several identical devices. The layers may contain structures that facilitate assembly, whereby a stack is formed. Two types of such structures are typically considered, namely alignment structures and spacers. Alignment structures may be mechanical guides or optical elements that are suitable for the mutual alignment of different sheets. Spacers may be separate spacer layers or may be monolithically integrated with the optical sheet.

The components, mounts and structures may be placed on either a single side or on both sides of the optical sheet. Where both sides of the optical sheet are used for replication, alignment between elements on each side is important. More complex designs are possible when optical elements are present on both sides, and the optimal optical design for a given device is thus likely to depend on the type of the replication method. The replication of optical elements on both sides of an optical sheet introduces additional requirements of alignment, since the elements on one side of the sheet should be aligned with the elements on the other side.

Components, mounts and structures are referred to herein as elements. Replicated elements are those elements that are formed on the optical sheet by the replication process, and may include components, mounts or structures. An optical sheet is a layer that carries an element.

The base is fabricated, at step 504. Base fabrication includes machining surfaces in a base that is typically metallic. The optical design produced in step 502 is the basis for the design of the metal base. The base contains mounts for the optical element parts that are specified in the design process. The design of the base is also determined by the mounts for sub-systems, structures for assembly and the overall shape of the replication tool. The base may be formed from any suitable material that can be machined. Suitable metals include aluminum and aluminum alloys, such as aluminum 6082 and other aluminum alloys based on Si, Mg and Mn alloying constituents. Aluminum alloys that include free-cutting constituents or copper are generally not as useful as, for example, aluminum 6082, since they lead to formation of sludge during a subsequent selective etching process.

The base may also be formed from copper, which does not require electroplating with gold. Furthermore, since copper requires a different etch from an aluminum etch, there is little or no sludge problem.

The base is advantageously formed to avoid structures that prevent release of the tool from the replica due to unsuitable release angles. Also, deep and narrow structures on the base may be difficult to cover with metal during electrodeposition due to stagnant gas bubbles, thereby leading to porosity in the replication tool. Therefore, the use of deep cavities and areas with vertical orientation is preferably reduced where possible to ease the subsequent electrochemical deposition and replication processes. The base may be formed from a metal disk having a thickness of around 5 mm-10 mm and a diameter in the range 100 mm-150 mm, although disks having dimensions outside these ranges may also be used.

Figure 6A:
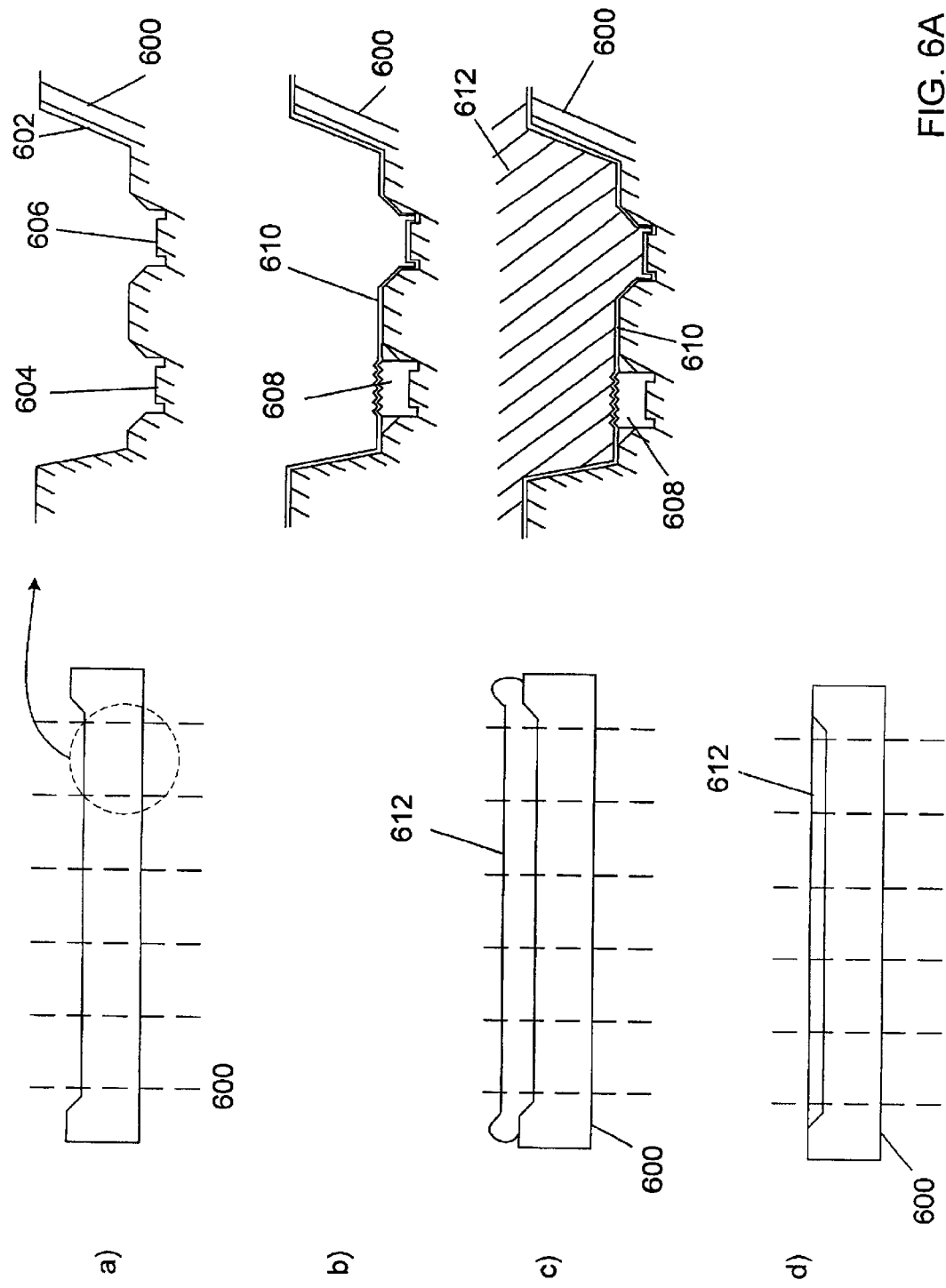
FIGS. 6A and 6B schematically illustrate different stages of forming a replication tool according to the process listed in FIG. 5.
Figure 6B:
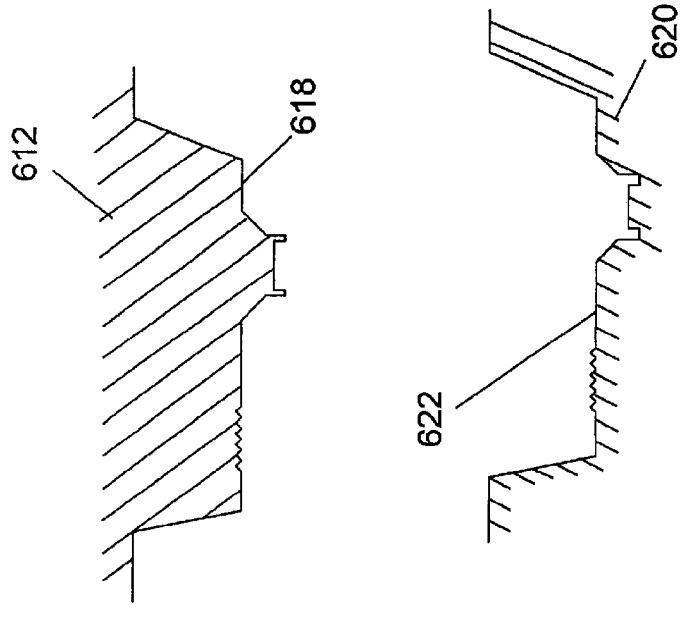
Figure 6B:
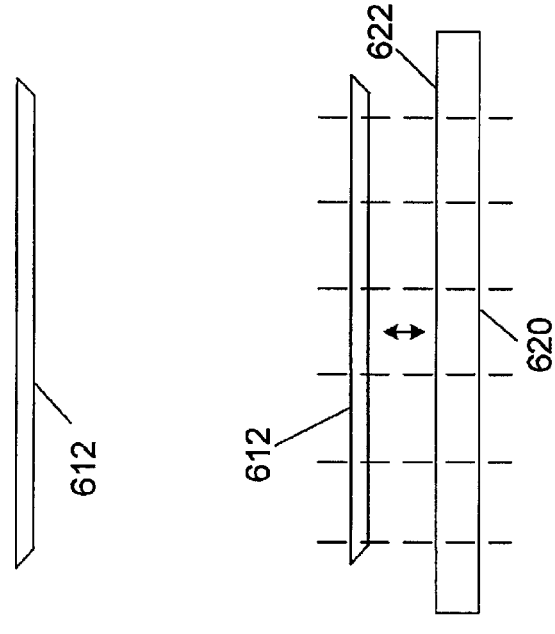

Examples of various stages of the process listed in FIG. 5 are presented in FIGS. 6A and 6B. The left sides of FIGS. 6A and 6B illustrate a macroscopic view at the level of the entire base or replication tool, while the right side shows an expanded view at the level of an exemplary cell.

An example of a base 600 is schematically illustrated in line a) of FIG. 6A. The base 600 comprises several cells 602, which may be identical, although need not be identical. The cell 602 is machined to provide mounting positions for optical element parts and to provide portions that, when replicated, allow for the post-replication mounting of optical elements. The illustrated embodiment of cell 602 corresponds to a master that is used to make a sheet like optical sheet 464 illustrated in FIG. 4C. Mounting position 604 is prepared to receive a diffracting part 608 that is used to shape the replication tool with the diffracting element 404. Mounting position 606 is prepared to make a mounting position on the optical sheet for the detector 408.

Figure 7A:
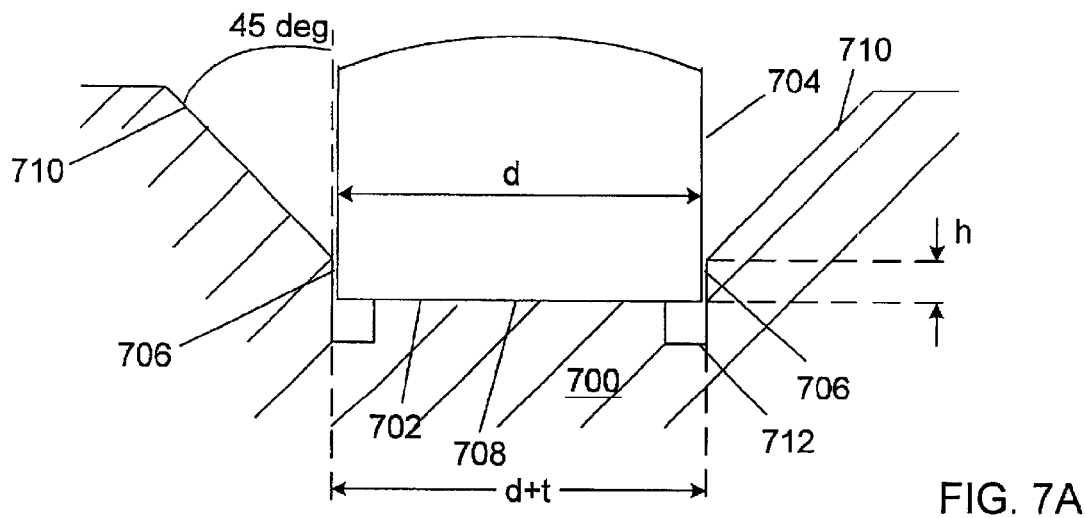
FIGS. 7A and 7B schematically illustrates details of preparing a base for forming a replication tool, according to an embodiment of the present invention.

A mounting position 702 in a base 700 for receiving an optical element part 704 is illustrated in greater detail in FIG. 7A. If the optical element part 704 has a width d, then the width of the mounting position 702 is d+t, where t is the gap tolerance. Preferably, t is as small as possible in order to reduce uncertainty in the positioning of the optical element part 704. The mounting position 702 may have side walls 706 that are perpendicular to the floor 708. The walls 706 extend to a height h. A lower h/d ratio generally permits a smaller value of t. Angled walls 710 slope away from the side walls 706, thus making insertion of the optical element part 704 into the mounting position easier. The angled walls 710 may slope at an angle of around 45° relative to the side walls 706.

Figure 7B:
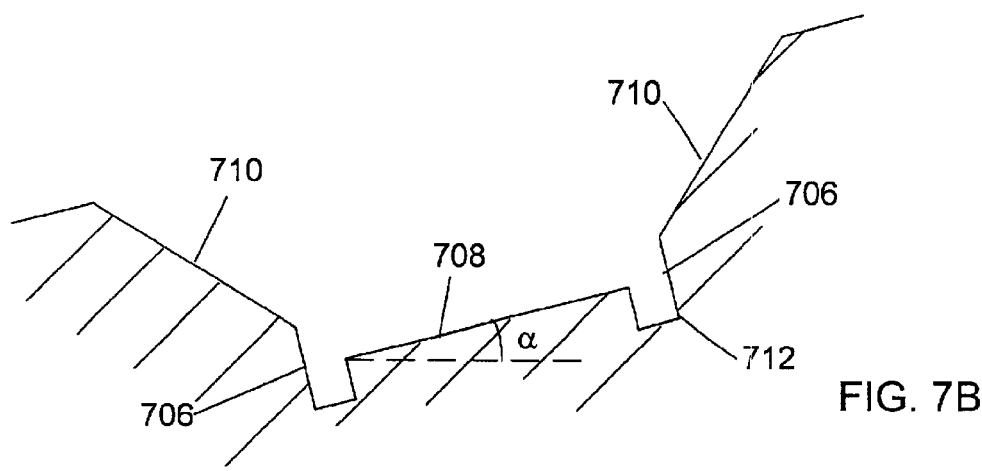

A relief groove 712 may be cut into the base 700 to ensure that the optical element part 704 sits on the floor 708 at the desired angle. It will be appreciated that the floor 708 may be set parallel with the base 700, or may be set at some other angle, a, for example as illustrated in FIG. 7B.

The optical element part 704 provides the shape of the optical element to be replicated. For example, if the optical element to be replicated is a lens, then the optical element part 704 may be either a lens of the desired shape, or a part shaped like the desired lens. It will be appreciated that many different types of optical element parts may be used. For example, a prism-shaped part may be used for producing a flat surface at an angle relative to the optical sheet. The prism-shaped part need not be an optically transmitting prism, but may be formed, for example, from an opaque material. The optical element parts may be formed from optical materials, such as glass, polymers, crystals or the like, or may be formed from other materials such as metal or ceramic.

Furthermore, a surface lying at an angle, α, on an optical sheet may be mastered by placing a planar glass optical element part, or a prism-shaped optical element part on an angled mounting portion on the base. For example, if a base design calls for a surface at 35°, then the base may be provided with a mounting portion 730, angled at 35°, on which a planar optical element part 732 is mounted, as schematically illustrated in FIG. 7C. In another approach, the base may be provided with an angled mounting portion and a wedged optical element part. For example, to achieve a surface at 35°, the mounting portion 740 may be angled at 5°, and a 30° prism-shaped optical element part 742 is mounted on the mounting portion 740, as illustrated in FIG. 7D. These approaches may each be more straightforward than machining or obtaining optical element parts that have an exact wedge angle for mounting on a flat base.

Figure 7F:
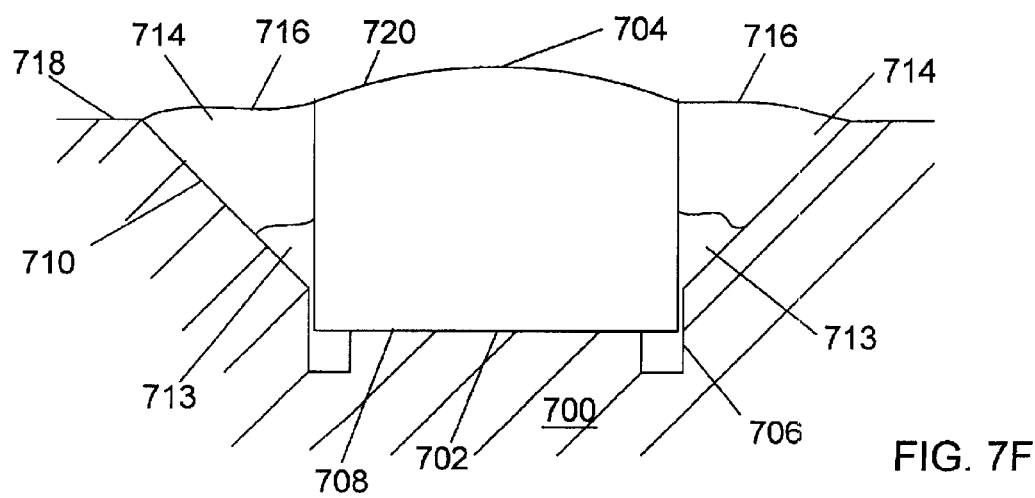
FIG. 7F schematically illustrates a method of mounting an optical element part to a base according to the present invention.
Figure 7C:
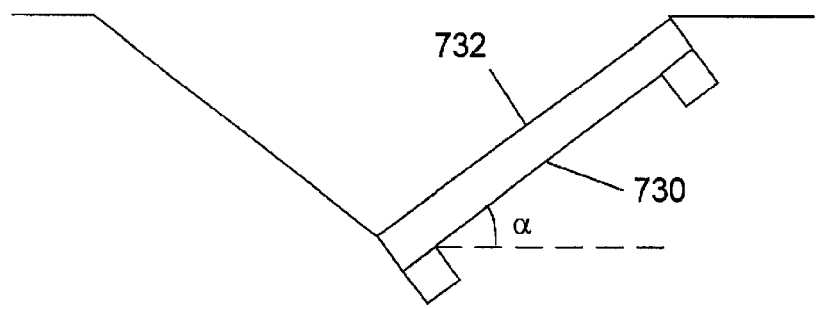
FIGS. 7C and 7D schematically illustrate different approaches to producing an angled surface according to the present invention.
Figure 7D:
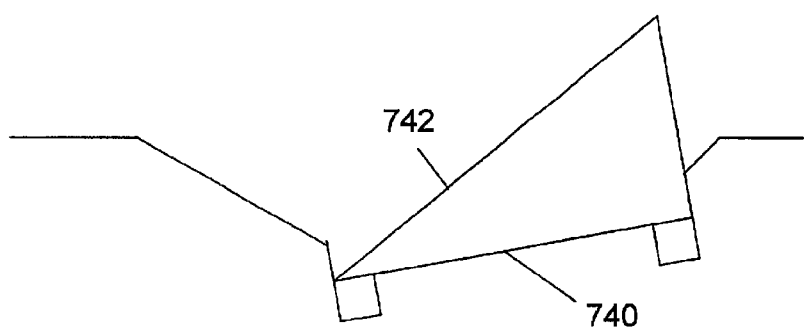
Figure 7E:
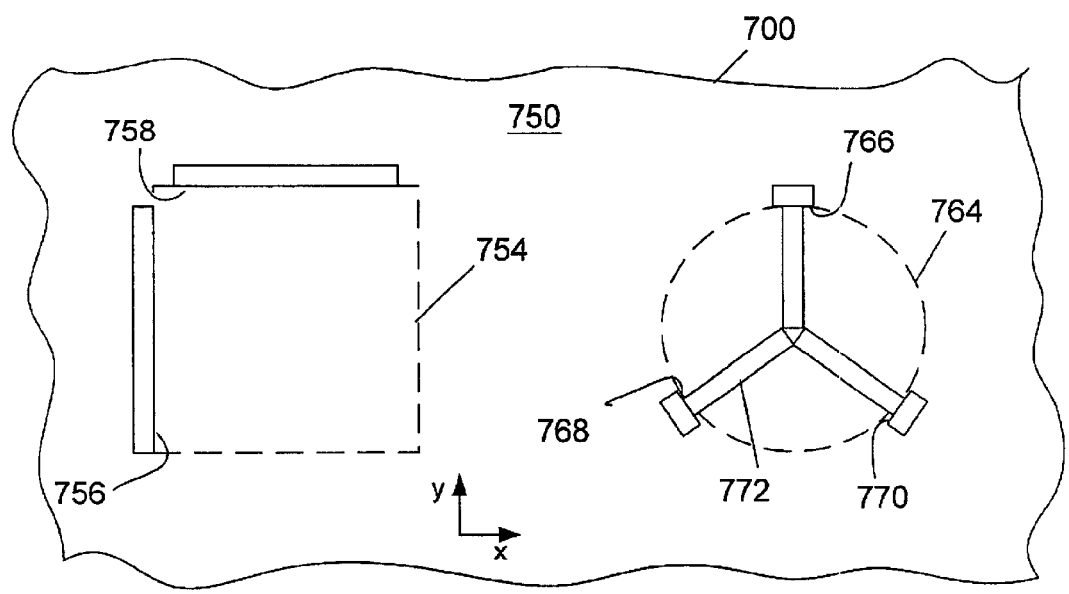
FIG. 7E schematically illustrates different approaches to producing side wall on a base according to the present invention.

Other approaches to forming mounting positions are shown in FIG. 7E, which schematically illustrates a top surface 750 of a base 700. In these approaches, the side walls do not extend all the way around the optical element part, but extend part way around the optical element part, advantageously permitting precise positioning of the optical element parts. An optical element part 754, shown with dashed lines and having a generally rectangular shape, is illustrated butted against two side walls 756 and 758 that limit the position of the optical element part 754 in the −x and +y directions respectively. Angled walls are omitted from the figure for clarity.

A circular optical element part 764, shown with dashed lines and having a generally circular shape, is illustrated positioned among three side walls 766, 768 and 770 which, together, limit the position of the circular optical element part 764 in the x and y directions. The floor for mounting the optical element part 764 may be provided by a number of supporting arms 772, rather than a surface that extends under the entire area of the optical element part 764.

It will be appreciated that other configurations of side walls and floors may be used to accurately position the optical element parts on the base 700. The side walls and floors actually selected for a particular optical element part are advantageously selected depending on the geometry of the particular optical element part and its position and orientation on the base.

An aluminum base may be gold plated to withstand the corrosive action of the subsequent electroplating process. Such plating may be performed using a pre-treatment called Alugal zincate treatment, a product from Balsberg Company, Germany, followed by gold plating of the type Engold RPC 95, a product from Engelhard Company, (Germany).

Once the base 600 has been fabricated, the optical element parts are mounted to the base 600, at step 506. The optical element parts are typically glued into the respective mounting positions provided in the base, for example using a UV curing glue, such as Loctite 358 UV curing glue available from Loctite Corp., USA. In line b) of FIG. 6A, a diffractive optical element part 608 is positioned and glued in the mounting position 604.

An expanded view of one method of attaching an optical element part 704 to the base 700 is illustrated in FIG. 7F. The adhesive 714 may be disposed between the angled walls 710 and the optical element part 704. In one embodiment of a method of attaching the optical element part 704 to its mounting position 702, the optical element part may first be attached in place by a small number of drops 713 of adhesive, such as UV curing cement or UV curing epoxy. Two or more drops 713 may be used. After curing the initial drops 713, the gap between the angled walls 710 and the optical element part 704 may be filled with a filler 714. The filler may be additional adhesive, or may be a material having a low surface tension, for example a silicone, so as to provide a planar surface between the base 700 and the optical element part 704. Preferably, the surface 716 of the adhesive 714 provides a smooth transition between the surface 718 of the base and the surface 720 of the optical element part 704. In another approach, the optical element part 704 may be positioned on the base 700 and the spaces between the optical element part 704 and the angled walls filled with adhesive.

Additionally, as well as mounting optical element parts to the base 600, one or more optical element parts may be formed on the base 600 directly by machining the base 600. This may be performed, for example, using a high precision cutting operation such as diamond turning or other suitable technique.

Once all the optical element parts have been attached to the base 600, a conductive coating 610 is deposited over the base and the optical element parts, step 508, illustrated in line b) of FIG. 6A. The conductive coating 610 may be deposited, for example, by metal evaporation such as e-beam evaporation, or by sputtering. The conductive coating 610 may be formed from any suitably conductive metal and is preferably less than 100 nm in thickness, exhibits a sufficient conductivity for the subsequent electroforming process and has a roughness below $\frac{1}{20}$ to $\frac{1}{10}$ of the wavelength of the light that will be present in the final optical system.

The conductive coating 610 may be formed using one or more metals. One example of a conductive coating 610 includes a first layer of chrome, around 2.5 nm thick, followed by a layer of gold around 30 nm thick. Another example of a conductive coating is a 2.5 nm thick layer of titanium, followed by a 35 nm thick layer of gold. Other combinations of metals may be used, such as chromium and nickel.

The conductive coating 610 facilitates electrochemical deposition of a metal layer onto non-conductive components and is applied in such a way that the adhesion of the conductive coating 610 withstands the stresses that can arise during electrodeposition and at the same time allows mechanical detachment of the non-conductive elements during removal of the base.

Next, at step 510, one or several layers of metal are applied onto the base 600 using an electrochemical deposition method to produce the replication tool. Electrochemical techniques include electroforming, electrodeposition, electroplating and electroless deposition. One example of such a process is the Electrodeposition of nickel from a nickel sulphamate solution. Processes, which deposit layers with low stress and an even thickness distribution, are preferred. In FIG. 6, at line c), an electrochemically deposited metal layer 612 is shown deposited over the conductive coating 610.

Figure 8:
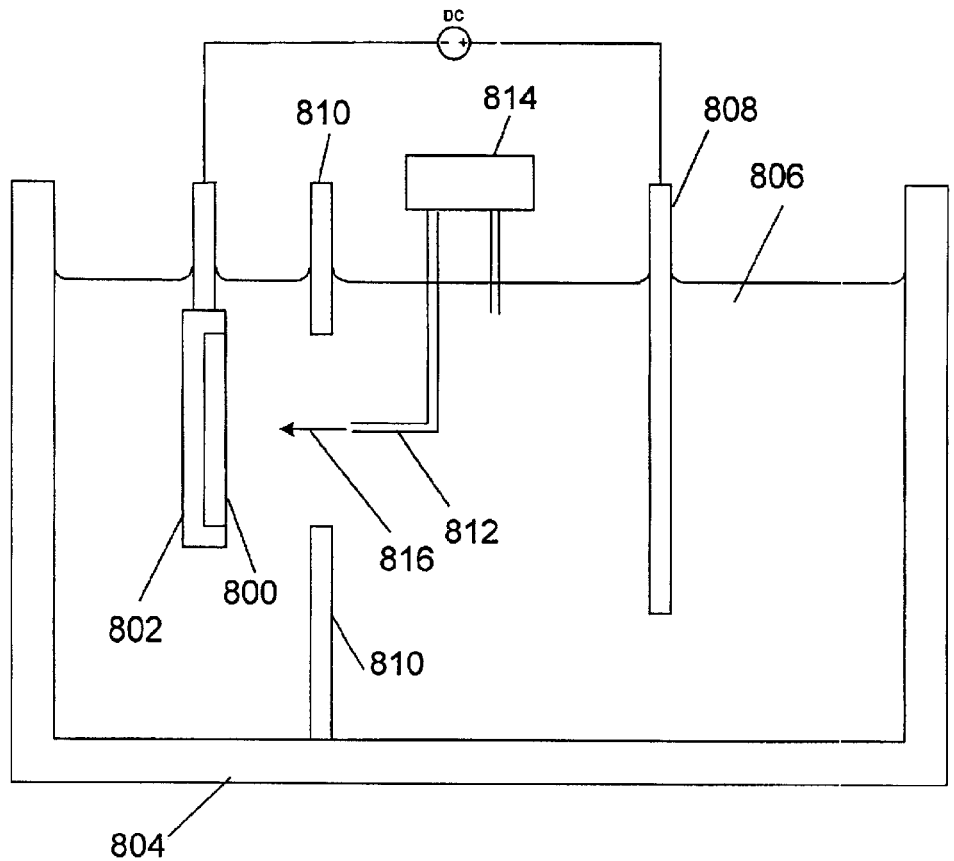
FIG. 8 schematically illustrates a method of electroforming a replication tool according to an embodiment of the present invention.

One suitable method of electrochemically depositing the metal layer 612 is electroforming, illustrated in FIG. 8. The base 800 is held in a holder 802 in a bath 804 filled with metal solution 806. Those parts of the base 800 upon which it is desired that no metal be deposited are covered, for example with wax, or some other type of masking agent. An anode 808 is positioned in the solution 806, and a current is passed between the anode 808 and the base 800, which forms the cathode. The anode may be formed of the same kind of metal as is in the solution, but this is not a requirement.

Figure 9:
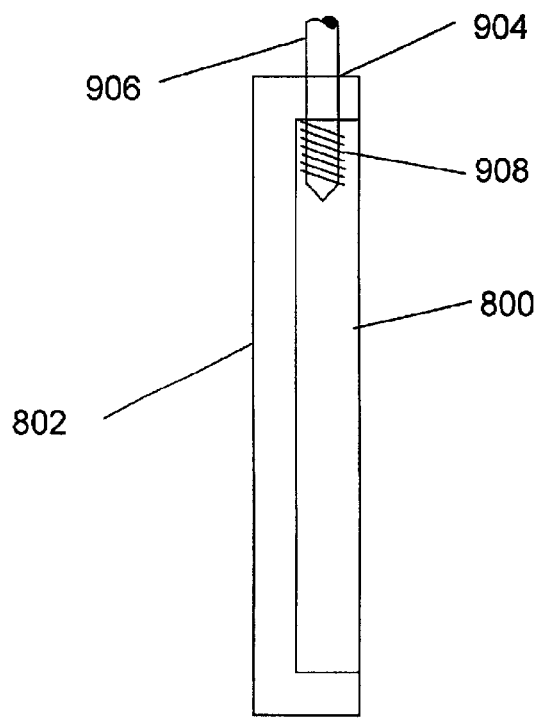
FIG. 9 schematically illustrates a base holder for electroforming the replication tool according to the present invention.

An expanded view of the base 800 in the holder 802 is presented in FIG. 9. The holder 802 may be made of a polymer that does not conduct electricity. A hole 904 passes through the side of the holder 802 so that an electrical connector 906 can be attached to the base 800, for example by screwing into a threaded hole 908.

The flow of the current between the base 800 and the anode 808 results in the deposition of the metal out of the solution 806 on to the base 800. A non-conducting current screen 810 may be placed between the anode 800 and the base 800 to make uniform the current density distribution incident on the base 800, so as to make uniform the distribution of metal grown on the base 800. Other approaches may be used for ensuring uniform metal deposition, including use of a current thief, a bi-polar anode, or an extra anode, as discussed in "Fabrication of Micro Components by Electrochemical Deposition, P. T. Tang, Ph.D. Thesis, Technical University of Denmark, Copenhagen, March 1998, pages 10–15, incorporated herein by reference.

A pipe 812, connected to a pump 814 may be used to pump a stream 816 of metal solution towards the base 800 to agitate the solution near the surface of the base 800, thus avoiding stagnant gas bubbles on the surface of the base.

The metal layer 612 thus grown may reach a thickness of several mm. Thinner metal layers 612 may be produced with the intention of shortening of the electrodeposition process. An example is 0.3 mm at the thinnest cross-section of the tool. The duration of the electrodeposition process is, however, determined by the sum of the specified minimal thickness plus the difference of the minimal and maximal vertical position on the base 600, if the whole backside of the metal layer 612 is to be free of voids after levelling. Therefore the presence of integrated spacers, for example as shown in FIG. 4C as integrated spacers 472 and 474, may preferably be avoided if a short electrodeposition duration time is required. An intermediate spacer, for example as illustrated in FIG. 4B as spacer 446, may be necessary for the assembly of two layers when the integrated spacers are omitted.

The electrodeposition process preferably employs a metal that exhibits hardness above 200 HV, low stress, good material distribution and a low tendency to entrap gaseous bubbles during electroplating. Examples of suitable materials include nickel, nickel alloys, cobalt alloys and copper. Multi-layers, such as a bi-layer of nickel and copper with enhanced thermal conductivity compared to pure nickel, can be applied.

Electroless deposition may be applied to deposit certain materials such as nickel-phosphorous alloy, or to control thickness distribution on complex structures. Alloys deposited by electroless deposition may enable formation of valuable metallurgical phases that promote increased strength and corrosion resistance.

In an example of a nickel electrodeposition process, the solution includes nickel sulphamate 300 g/l, nickel chloride 10 g/l, and boric acid 40 g/l. The solution is held at a temperature in the range 40° C.–70° C., preferably 40° C., and the pH is in the range 3.5–5.0. The d.c. current density at the base is 0.03 A cm$^{-2}$.

In an example of a pulse-reverse nickel chloride process, the solution includes nickel chloride 300 g/l, nickel sulphate 50 g/l, boric acid 40 g/l, and naphthalene-1,3,6-sulphonic acid 1–5 g/l. The solution temperature is kept at around 50° C. The cathodic pulse time is 0.1 s and the cathodic pulse current density is about 0.035 A cm$^{-2}$. The anodic pulse time is 0.02 s and the anodic pulse current density s about 0.0875 A cm$^{-2}$. Pulsed electrodeposition processes are further explained in PCT Publication WO 97/00980, entitled "AN ELECTROPLATING METHOD OF FORMING PLATINGS OF NICKEL, COBALT, NICKEL ALLOYS OR COBALT ALLOYS", incorporated herein by reference.

In one example of a copper process, the solution includes copper sulphate 100 g/l, sulphuric acid 190 g/l, chloride 60 mg/l (supplied as sodium chloride or hydrochloric acid) and CuPV1A 6 ml/l (brightening additive available from Enthone-OMI Inc, USA). The process is carried out at room temperature and the d.c. current density around 0.015 A cm$^{-2}$.

After the electrodeposition process, the electrodeposited metal layer 612 is levelled, or planarized, at step 512. Line d), in FIG. 6A illustrates the planarized metal layer 612. The backside of the metal layer 612 and moulding inlets are machined using a suitable process, such as grinding, milling or electron discharge machining. The metal layer is now referred to as a replication tool 612.

An accurate edge, suitable for securing the tool 612 in the replication family mold, may be formed indirectly by machining a negative structure in the base 600, or by direct machining of the replication tool 612. An advantage of indirect formation is that the edge and mount structures for the optics are milled with a single fixation. On the other hand, the presence of the edge of the base 600 may affect the electrodeposition process. An injection-moulding inlet may be formed in the centre of the tool using the same methods as are used to form the edge.

The replication tool 612 is then separated from the base 600, at step 514. The separation process may include mechanical detachment, selective etching of the base, or a combination of the two. The conductive coating 610 may be selectively etched along with the base 600, or may remain on the replication tool 612 when the base 600 is removed. The conductive coating 610 may be removed in a subsequent selective etching process. Line e) in FIG. 6B illustrates the replication tool 612 after separation from the base.

Where the base 600 is aluminum, the aluminum may be removed by selective etching in a 1 M NaOH solution at 50° C. with a rate of approx. 4 mm per day. The controlled adhesion of the metallic films on optical components leads to mechanical detachment of the optical components during the aluminum etch. Where the aluminum is gold plated, the gold layers may be removed by an Entreat 100 solution, supplied by Engelhard Company, Germany. If the conductive coating 610 includes titanium, the thin titanium layer typically does no: hinder the gold etch.

Where the base is formed from copper, then a suitable selective etch is a solution of 0.25 M ammonium persulphate and 0.5 M ammonia at room temperature. The pH is typically adjusted to around 9–10. If the replication tool 612 is made of a bi-layer of nickel and copper, then the copper layer is protected by tape or wax while the copper base is etched.

The last step is to finish the replication surface 618 of the replication tool, step 516. This may involve removing the conductive layer 610 and/or rinsing the replication surface 618. The conductive coating 610 may remain part of the replication tool 612, or the conductive coating 610 may be removed along with the base 600, either by mechanical separation, or selective etching. When the conductive coating 610 is removed from the replication tool 612, care is taken to preserve surface features of the replication tool 612. The conductive coating 610 may be removed in the same selective etching step that is used to remove the base 600, or may be removed in a subsequent selective etch after the base has; been removed.

Finishing the tool surface may also involve forming a replicating part for an optical element on the replication surface 618 directly. For example, a replicating part may be formed on the replication tool 612 by machining part of the replication surface 618 in a diamond turning process or other suitable technique of sufficiently high precision.

Rinsing processes may be included at any stage in the tool fabrication process, where appropriate. Care should be taken not to deteriorate the glue and any polymeric components when the base is rinsed before deposition of the conductive coating 610. A suitable approach is to glue in a clean environment, and rinse the base with a stream of particle-free nitrogen gas immediately before deposition of the conductive coating 610.

The replication tool 612 may be then be used for replicating surfaces 622 on optical sheets 620, as illustrated in line f) in FIG. 6B. Once a surface 622 has been replicated on an optical sheet 620, the surface 622 may be further processed by coating or adding components. For example, as illustrated in FIG. 1A, a coating 1004 may be added on a portion of a replicated surface 1002. The coating 1004 may be, for example a reflective metallic or dielectric coating, a partially reflective coating, an interference filter coating, an antireflection coating, a polarizing coating, a dichroic coating, or any other suitable type of coating. The coating may be applied to a portion of the replicated surface that is parallel to the base replicated surface, or may be applied to an angled portion of the surface, as illustrated.

Figure 10A:
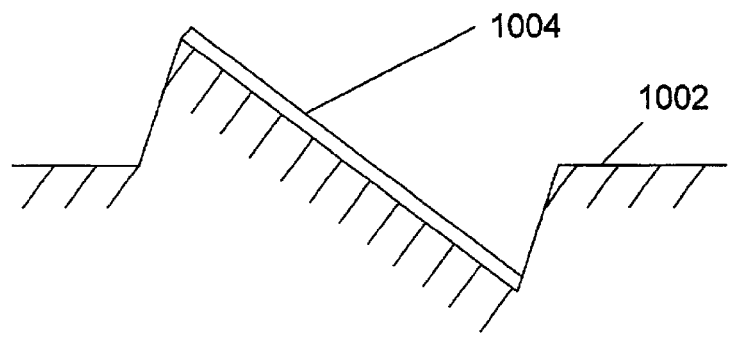
FIG. 10A schematically illustrates a coating on a replicated surface according to an embodiment of the present invention.
Figure 10B:
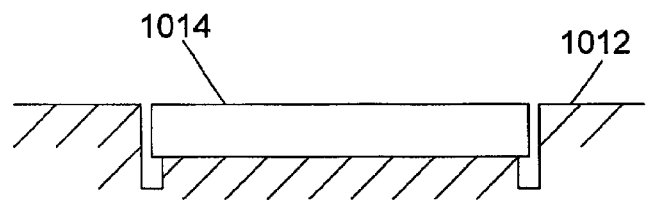
FIG. 10B schematically illustrates an optical element attached to a replicated surface according to the present invention.

In another example, schematically illustrated in FIG. 10B, a polarizing element 1014 such as a retarder plate or a reflective polarizer may be disposed on a replicated surface 1012. Typically, polarizing elements are formed from crystalline materials or from stretched polymer materials. In any case, it is often not feasible to replicate an optical sheet from a material that manifests easily controlled birefringent properties, and so it may be preferable to attach a polarizing element 1014 after the surface 1012 has been replicated. The polarizing element 1014 may be mounted on an angled surface, or a surface parallel to the surface of the optical sheet, as illustrated.

In some embodiments, an optical sheet may be stacked with one or more replicas of itself in order to produce optical circuit cells. For example, if the optical circuit includes only one type of cell that is replicated on the optical sheet, then as many optical sheets are stacked as are needed to fabricate the circuit cell.

Figure 11A:
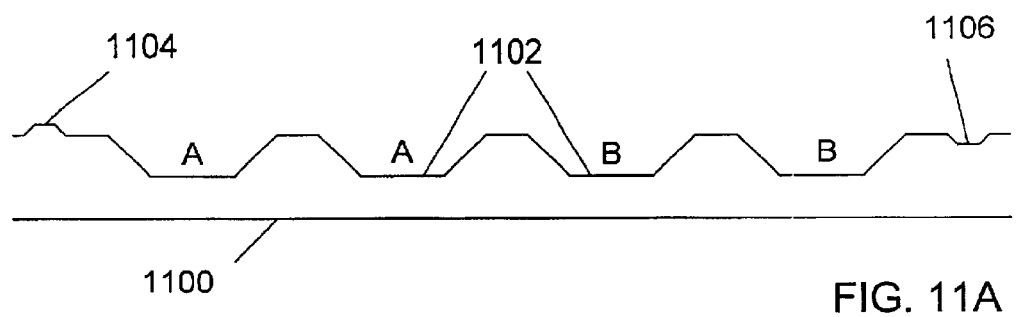
FIGS. 11A and 11B schematically illustrate a method of forming and stacking two different types of cells produced with a single replication tool, according to an embodiment of the present invention.

Another approach to stacking identical optical sheets 1100 is illustrated with reference to FIGS. 11A and 11B. In FIG. 11A, a replicated optical sheet 1100 has a number of different cells 1102. The cells 1102 are not all identical, but come in two types, labelled A and B. The replicated sheet may include alignment structures. In the illustrated embodiment, the sheet 1100 includes a male alignment structure 1104 to the outside of the sheet 1100 by the "A" cells, and a female alignment structure 1106 to the outside of the sheet by the "B" cells.

Figure 11B:
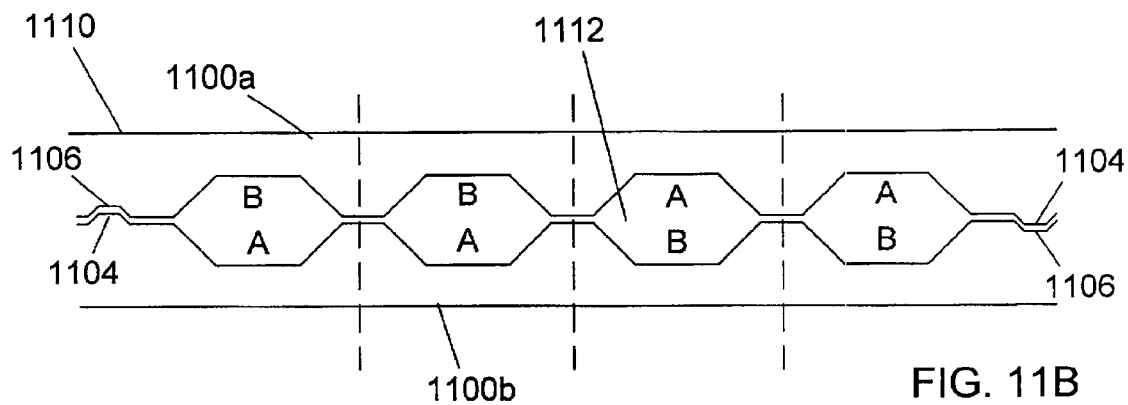

A stack 1110 of two optical sheets 1100 is illustrated in FIG. 11B, with one optical sheet 1100a being inverted relative to the other optical sheet 1100b. Each stacked cell 1112 includes an "A" cell from one of the sheets 1100a and 1100b, and a "B" cell from the other sheet, and so the stack 1110 produces optical systems that include "A" and "B" cells. An advantage of this arrangement is that only one replication tool is required to make a single type of optical sheet 1100. Since the optical sheet 1100 includes different types of cells, 1102, the optical sheet 1100 may be stacked to form systems. This technique may be used, for example, to form optical sheets for the spectrometer 460 illustrated in FIG. 4C. The male and female alignment structures 1104 and 1106 advantageously mate when the sheets 1100a and 1100b are stacked.

It will be appreciated that other arrangements of cells on the sheet may be used to give a similar effect. For example, instead of positioning one type of cell on one half of the optical sheet 1100 and the other type of optical cell on the other half of the optical sheet 1100, the different cell types may be alternated in the pattern . . . ABAB, or alternated in groups as . . . AABBAABB . . . The grouping of the different types of cell is performed in a manner so that, when one optical sheet 1100 is inverted over the other, each of the "B" type cells on the inverted optical sheet correspond to a respective "A" type cell in the other optical sheet. Similarly, each of the "A" type cells of the inverted sheet correspond to a respective "B" type cell in the other optical sheet. Other patterns of "A and "B" type cells may be used.

Figure 11C:
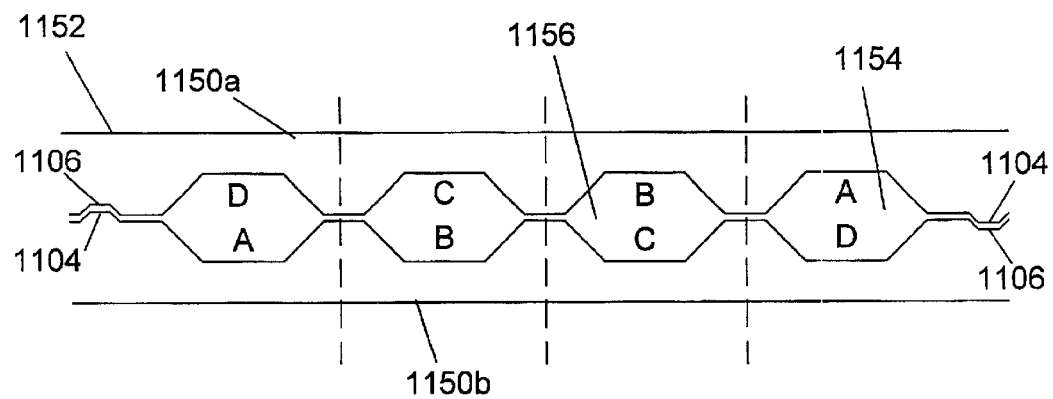
FIG. 11C schematically illustrates a method of forming and stacking four different types of cells produced with a single replication tool, according to an embodiment of the present invention.

Furthermore, an optical sheet may include more than two types of cells. For example, as illustrated in FIG. 11C, an optical sheet includes four different types of cells, referred to as A, B, C, and D cells. Two identical such sheets 1150a and 1150b are stacked one on top of the other, the upper sheet 1150a being inverted relative to the lower sheet 1150b, to form a stack 1152. Two different types of optical circuit cells are formed in the stack: a first type of optical circuit cell 1154 includes A and D cells, and the second type of optical circuit cell 1156 includes B and C cells. Other combinations of different cells may be formed using identical optical sheets.

Figure 12:
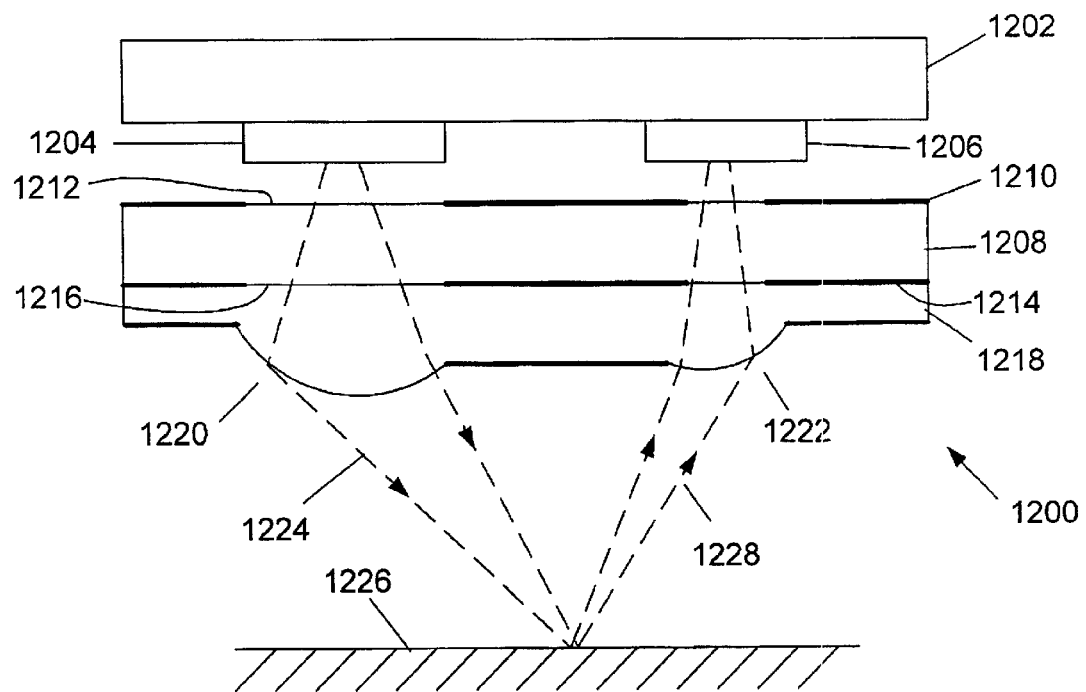
FIG. 12 schematically illustrates an embodiment of an optical sensor fabricated according to the present invention.

An embodiment of an optical sensor 1200 fabricated according to the present invention is described with reference to FIG. 12. The sensor 1200 includes a first optical sheet 1202 that has a light source 1204, such as a light emitting diode (LED) or a laser, for example a vertical cavity surface emitting laser (VCSEL), that emits light at a particular wavelength or over a particular wavelength range.

The first optical sheet 1202 also includes a detector 1206, for example a semiconductor photodiode, or the like, to detect light.

The second optical sheet 1208 includes a first mask 1210 on an upper surface 1212 and a second mask 1214 on a lower surface 1216. The third optical sheet 1218 includes first and second lenses 1220 and 1222. The first lens 1220 may be positioned to direct the light 1224 emitted from the light source 1204 towards an object 1226. The second lens 1222 collects light 1228 from the object 1226 and focuses the light 1228 towards the detector 1206. The masks 1210 and 1214 prevent stray light from reaching the detector 1206.

In one embodiment, the detector 1206 is a position sensitive detector, which may be, for example, an array of two or more separate detector elements. In such an embodiment, the detector 1200 may be used for measuring distance between the sensor 1220 and the object 1226. When the object 1226 is at different distances, the light 1228 from the object 1226 is incident on different detector elements 1206, for example on different elements of the detector array. The distance between the sensor 1200 and the object 1226 may be calculated from a triangulation analysis of the output and input beams 1224 and 1228.

Figure 13:
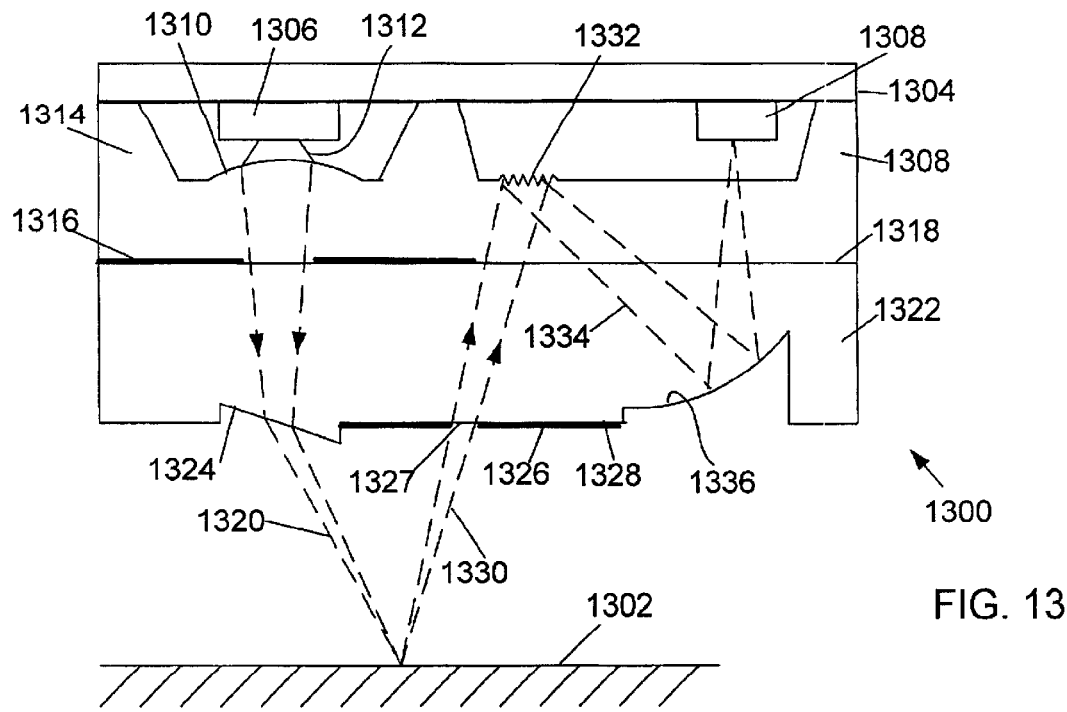
FIG. 13 schematically illustrates an embodiment of a color sensor according to the present invention.

Another embodiment of a sensor 1300 is illustrated in FIG. 13. The sensor 1300 may be used as a color sensor, for example to measure the spectrum of light reflected by the surface 1302 of an illuminated object. The first optical sheet 1304 includes a light source 1306, preferably a broadband light source. The light source 1306 may be, for example, a single broadband emitter, or a three color LED emitter. The first optical sheet 1304 also includes a detector 1308, such as a photodetector array or the like.

The second optical sheet 1308 includes a lens 1310 that gathers the light 1312 emitted by the light source 1306 and directs the light 1312 towards the surface 1302 being measured. The second optical sheet 1308 may be separated from the first optical sheet 1304 by an integrated spacer 1314, or may be separated by a separate spacer (not shown). A mask 1316 on the lower surface 1318 of the second optical sheet 1308 may be used to define the light beam 1320 incident on the object 1302 and to restrict the passage of stray light. The mask, or a second mask, may also be provided on another surface of one of the other optical sheets.

The third optical sheet 1322 includes a prismatic surface 1324 that directs the beam 1320 towards the object 1302. Another mask 1326, on the lower surface 1328 of the third optical sheet 1322, has an aperture 1327 that defines the input beam 1330 returned to the sensor 1300 from the object 1302. The beam 1330 is incident on a reflective diffracting element 1332 that is positioned on the upper surface of the second optical sheet 1308. The diffracted beam 1334 from the diffracting element 1332 is directed to a curved reflector 1336 that focuses the light to the detector 1308. The curved reflector 1336 is typically a coated reflector.

In this embodiment of sensor 1300, the optical path defined by the aperture 1327, the grating 1332, the curved reflector 1336 and the detector 1308 is somewhat similar to the optical path through the embodiments of spectrometer illustrated in FIGS. 4A–4C. Note, however, that in the current embodiment 1300, light travels from the aperture 1327 to the grating 1332, the curved reflector 1336 and to the detector 1308 within the material of the second and third optical sheets 1308 and 1322, rather than in free space.

The surfaces of the different optical sheets 1308 and 1322, at least those portions where a light beam passes through, may be provided with antireflection coatings in order to reduce reflective losses. It will be appreciated that antireflection coatings may be used in the several optical circuits described herein, in addition to the color sensor 1300. Also, reflective losses between optical sheets may be reduced by electrochemical bonding between sheets, where the optical sheets and the bond are formed of the same material, or by using an adhesive that has a refractive index close to that of the optical sheets, to provide index matching.

Figure 14:
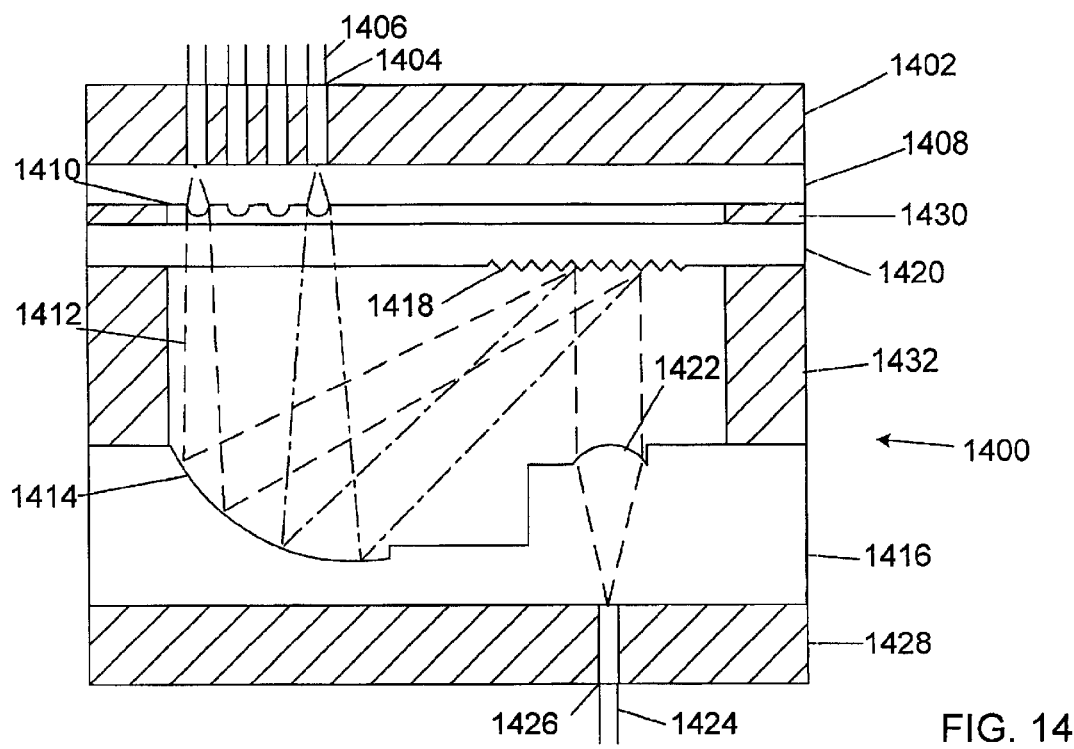
FIG. 14 schematically illustrates an embodiment of a DWDM spectrometer-based device according to an embodiment of the present invention.

An embodiment of a wavelength dependent device 1400, that may be used with optical fibers, is described with reference to FIG. 14. This device 1400 may be useful in dense wavelength division multiplexed (DWDM) optical communications where a multiple channel communications signal is transmitted along an optical fiber. In this particular embodiment, the device 1400 may be used either to physically separate different optical channels or to combine different channels, and therefore, may be used as a multiplexer (MUX) or a demultiplexer (DMUX).

The device 1400 includes a top sheet 1402 that includes a number of channels 1404 to receive different optical fibers 1406. The top sheet 1402 may be formed from silicon that has been anisotropically etched to produce the different channels 1404.

A first optical sheet 1408 includes a lens array 1410, typically having individual lens elements that correspond to individual fibers 1406. The lens elements of the lens array 1410 collimate, or at least substantially reduce divergence of, light entering the device 1400 from the fibers 1406. The light beams 1412 from the lens array 1410 are directed to the curved reflector 1414 on the third optical sheet 1416. The curved reflector directs the individual beams 1412 to the reflective diffracting element 1418 on the second optical sheet 1420. The diffracting element 1418 diffracts the light beams to the lens 1422 on the third optical sheet 1416. The lens 1422 focuses the light to the fiber 1424 in the channel 1426 of the bottom sheet 1428.

Where the light beams entering the device 1400 through the different fibers have the appropriate different wavelengths, corresponding to the different optical channels of the multiple channel optical communications signal, then the different beams may be combined into the one fiber 1424, to produce the multiple channel signal. It will be appreciated that the device 1400 may also operate in a reverse direction, in which a multiple channel signal enters the device from the single Fiber 1424, the individual channels are separated by the diffracting element 1418, and the individual channels are directed into respective fibers 1406.

Like the top sheet 1402, the bottom sheet 1428 may be formed from anisotropically etched silicon, or some other suitable material, to form the channel 1426 that receives the fiber 1424. The first, second and third optical sheets 1408, 1420 and 1416 are typically formed from optically transmissive material and include replicated optical elements. The first optical sheet 1408 includes a replicated lens array 1410, the second optical sheet 1420 includes a replicated diffracting element 1418 and the third optical sheet 1416 includes replicated curved mirror 1414 and lens 1422. The different replicated elements may be formed using a replication tool that itself was formed from optical element parts mounted on a base.

Another approach to forming the small-featured optical elements, rather than replication, may be used. For example, the lens array 1410 may be formed on the second optical sheet 1408 using directional reactive ion etching (RIE) of fused silica or other suitable transparent material. The photoresist patterns that define the etch patterns may be formed using grey-scale photolithography. Advantages of using fused silica are that the transparency is high, the thermal expansion is low, the thermal dependence of the refractive index is low and the material is chemically resistant. The diffracting element 1418 may also be formed by RIE of fused silica or other suitable material. In this case, the photoresist patterns that define the etching patterns may be exposed using the interference of two coherent light beams in a photolithographic method.

Spacers may be disposed between the various optical sheets 1408, 1420 and 1416, and/or the top and bottom sheets 1402 and 1428. In the illustrated embodiment, separate spacers 1430 and 1432 are placed respectively between the first and second optical sheets 1408 and 1420, and between the second and third optical sheets 1420 and 1416. Separate spacers are particularly useful where the first and second optical sheets 1408 and 1420 are formed from fused silica.

Figure 15:
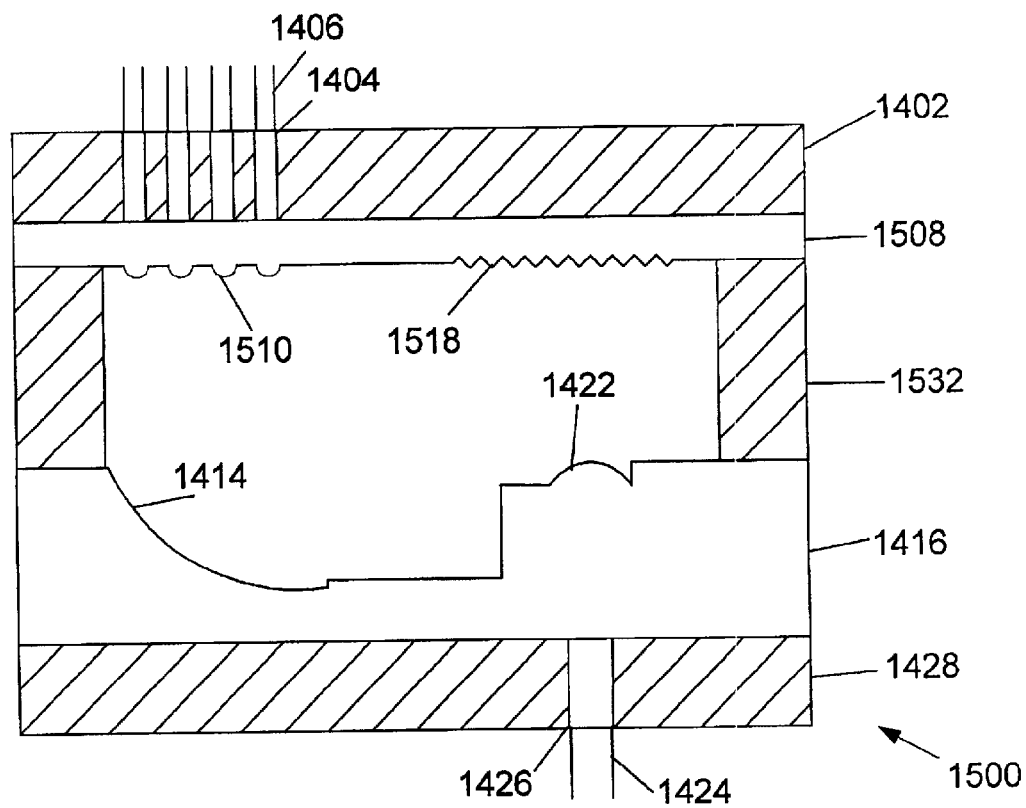
FIG. 15 schematically illustrates another embodiment of a DWDM spectrometer-based device according to an embodiment of the present invention.

Another embodiment of a MUX/DMUX device 1500 according to the present invention is illustrated in FIG. 15. The device 1500 includes a top sheet 1402 that has fibers 1406 terminating in channels 1404, a third optical sheet 1416 having a curved reflector 1414 and a lens 1422, and a bottom sheet 1428 having a multiple-channel fiber 1424 terminating in the channel 1426.

In this embodiment, the lens array 1510 and the diffracting element 1518 are formed on a first optical sheet 1508, and a spacer 1532 separates the optical sheets 1508 and 1416. In this embodiment, the lens array 1510 and the diffracting element 1518 may each be formed by replication on the surface of the first optical sheet 1508. It will be appreciated that the lens array 1510 and the diffracting element 1518 may also be formed on different sides of the optical sheet 1508. Furthermore, the lens array 1510 and the diffracting element 1518 may also be formed on the optical sheet using directional RIE, as described above with respect to the device 1400 illustrated in FIG. 14.

Figure 16B:
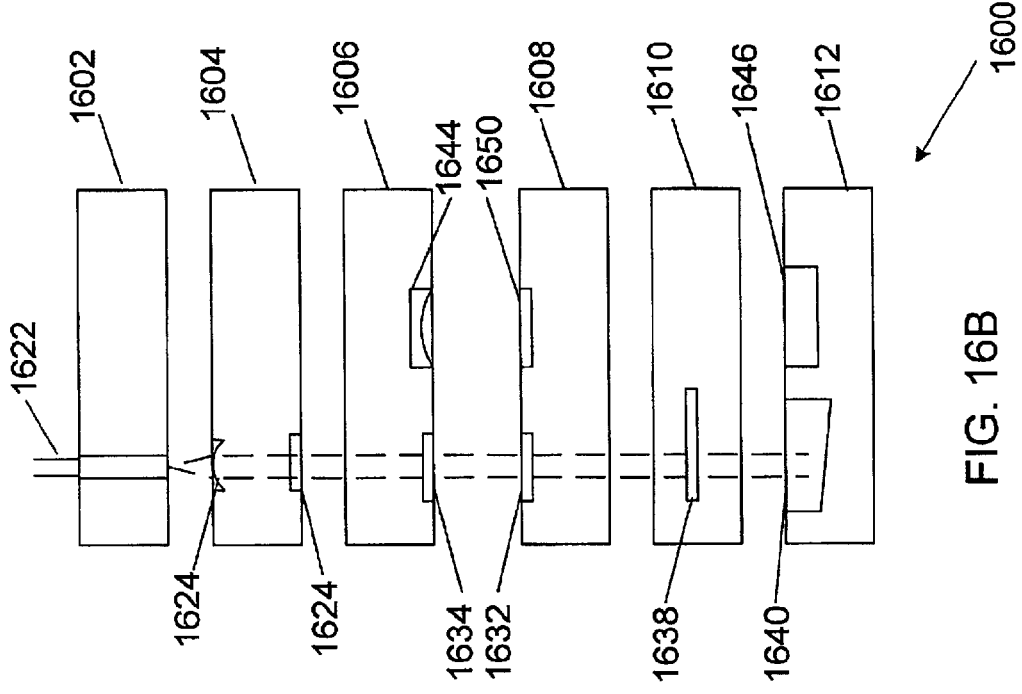
FIGS. 16A and 16B schematically illustrate an embodiment of a stacked planar integrated optical device that uses a transmissive diffractive optical element according to the present invention.
Figure 16A:
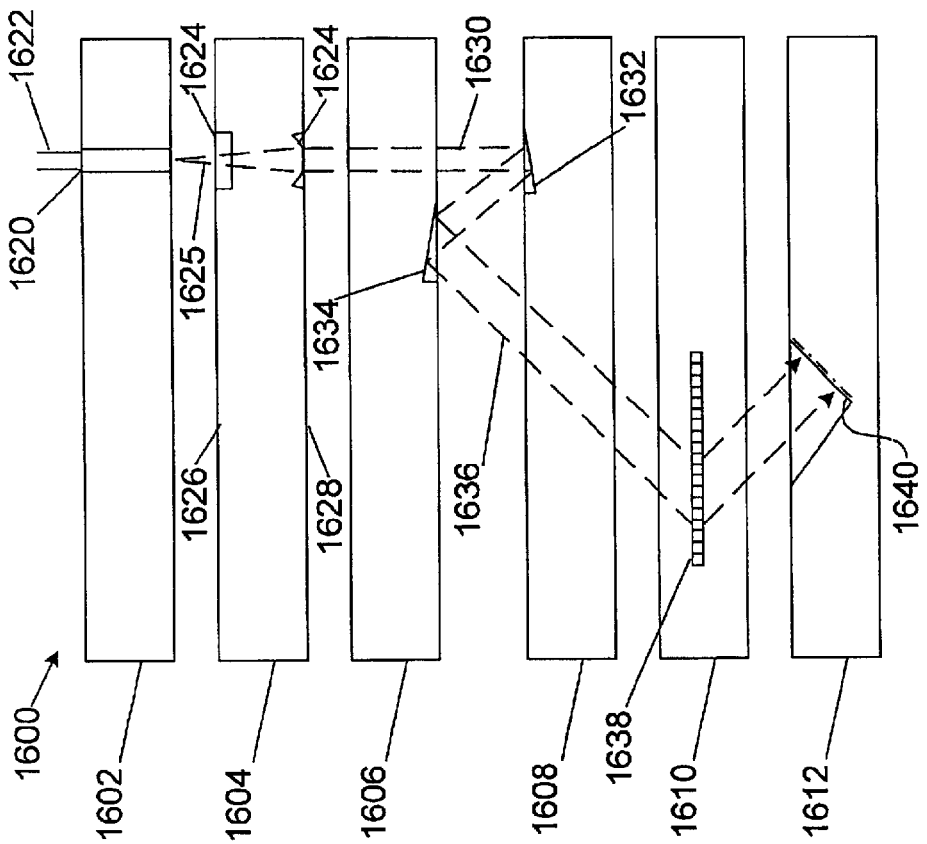

An embodiment of a DWDM device 1600 based on a transmissive diffracting element is illustrated in FIGS. 16A and 16B. FIG. 16A shows a front view of the device 1600, and FIG. 16B shows a side view of the device 1600. This particular embodiment includes six optical sheets, 1602–1612, illustrated as being separated from each other for clarity.

The first optical sheet 1602 includes at least one channel 1620 to hold a fiber 1622. The second optical sheet 1604 includes one or more lenses 1624 to collimate light 1625 from the fiber 1622. The lenses 1624 may be cylindrical lenses or circularly symmetrical lenses. Where the lenses 1624 are cylindrical, the lenses are typically disposed on both the upper and lower surfaces 1626 and 1628 of the second optical sheet, with the cylindrical axes of the lenses on one surface 1626 being oriented differently from the cylindrical axes of the lenses on the other surface 1628. Where the lenses 1624 are circularly symmetrical, the lenses 1624 may be provided on either of the surfaces 1626 or 1628, or on both surfaces 1626 and 1628.

The collimated light 1630 passes through the third optical sheet 1606, and reflects off an angled reflector 1632 on the fourth optical sheet 1608 to an angled reflector 1634 on the third optical sheet 1606. The angled light 1636 passes through the fourth optical sheet 1608 to a transmissive diffracting element 1638 on the filth optical sheet 1610. The transmissive diffracting element 1638 may be positioned on one of the surfaces of the fifth optical sheet 1610. The diffracting element 1638 may be formed by replication, or may be a diffractive element formed by a micro-forming process, for example RIE, as taught in U.S. patent application Ser. No. 09/789,888. The diffracting element may be, for e)ample, an encapsulated grating. Where the diffractive element 1638 is directly micro-formed, the diffractive element 1638 may be attached to the fifth optical sheet 1610 or may be formed directly on the fifth optical sheet 1610.

Figure 16D:
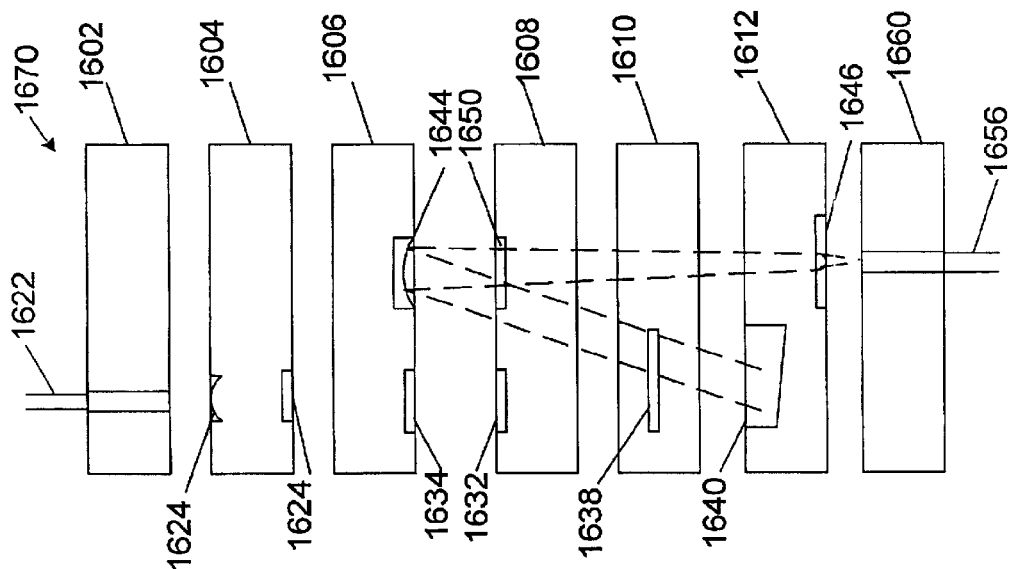
FIGS. 16C and 16D schematically illustrate an embodiment of a MUX/DMUX that uses a transmissive diffractive optical element according to the present invention.
Figure 16C:
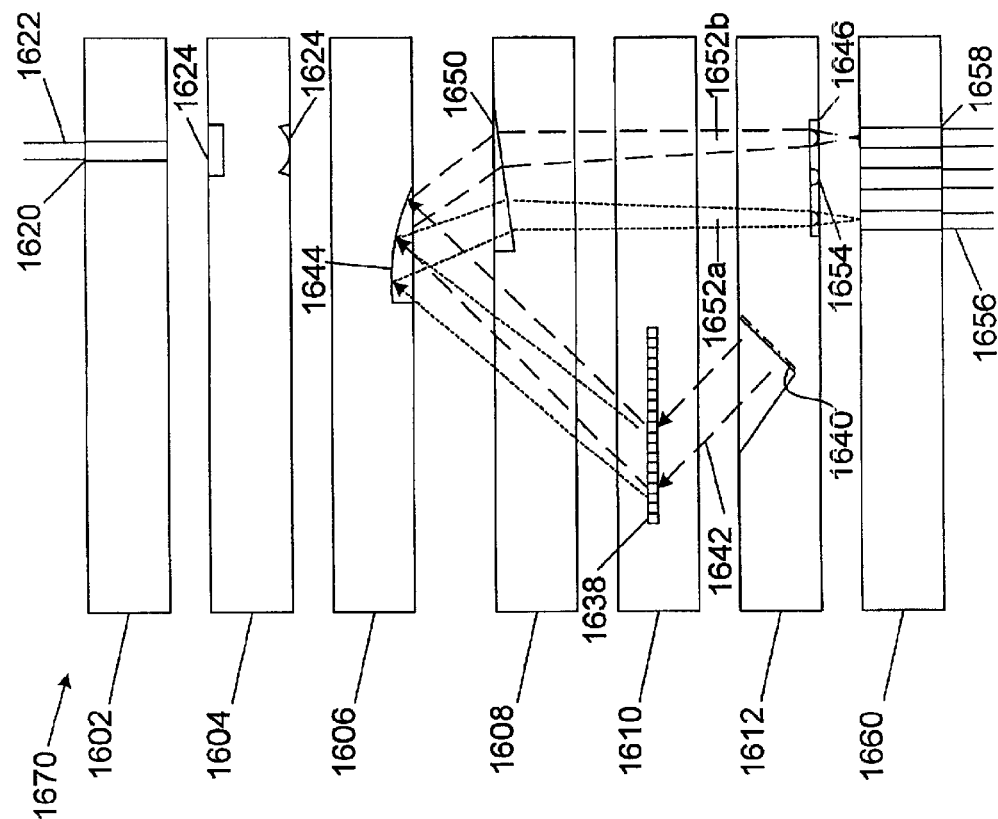

Light diffracted by the diffracting element 1638 is transmitted to the reflector 1640. FIGS. 16A and 16B illustrate the passage of light from the fibers 1622 to the reflector 1640. FIGS. 16C and 16D illustrate the passage of light after reflecting off the reflector 1640. FIGS. 16C and 16D (along with FIGS. 16B, 17A, 17B, and 18A–18D), should not be regarded as presenting cross-sections through the respective devices shown therein, but should be understood as presenting schematic spatial relationships between the various optical elements.

Light 1642 reflected by the reflector 1640 is diffracted by the diffracting element 1638 one more time and is then directed to a curved reflector 1644, which may be an aspheric curved reflector, which directs the light towards a lens array 1646 in the sixth optical sheet 1612. Between the curved reflector 1644 and the lens array 1646, the light may pass through another prism 1650, to direct the light towards the sixth optical sheet 1612. The light may also pass through an aspheric compensating lens (not shown), disposed between the prism 1650 and the lens array 1646. For example, the aspheric compensating lens may be disposed on the fifth optical sheet 1610.

The light incident on the curved reflector 1644 focusing has passed through the diffracting element 1638 twice, and so the different wavelength components of light entering the device 1600 from the fiber 1622 are spatially separated. FIG. 16C illustrates two such wavelength components, 1652*a* and 1652*b*, although it will be appreciated that many more wavelength components may be present. Each wavelength component 1652*a* and 1652*b* passes through a respective lens 1654 of the lens array 1646 and is focused into a respective fiber 1656 positioned in a channel 1658 in a seventh optical sheet 1660.

The device 1670 illustrated in FIGS. 16C and 16D operates as a DMUX, separating multiple channel light that enters the device 1670 at the fiber 1622 in a single beam into individual, single wavelength channel beams at the single channel output fibers 1656. It will be appreciated that the device 1670 may also operate as a MUX by reversing the direction of light passing through the device 1670, so as to combine different light beams entering the device at the fibers 1656 having different wavelengths into a single light beam at the multiple channel fiber 1622.

It will further be appreciated that the device 1600 may serve as the basis for other types of DWDM devices. For example, as illustrated in FIGS. 17A and 17B, a device 1700 may include components similar to those of device 1600, along with an array of detectors 1702 to detect the light at the different wavelengths 1652*a* and 1652*b*. The array of detectors 1702 may be formed from individual detectors arranged to detect the individual channels separated by the transmissive diffracting element 1638, or may include an integrated detector array, such as a linear photodiode array or a charged coupled device (CCD) array. The device 1700 may be operated as a channel monitor to monitor, for example, tie balance of light power in the different channels in an optical communications system.

Figure 18A:
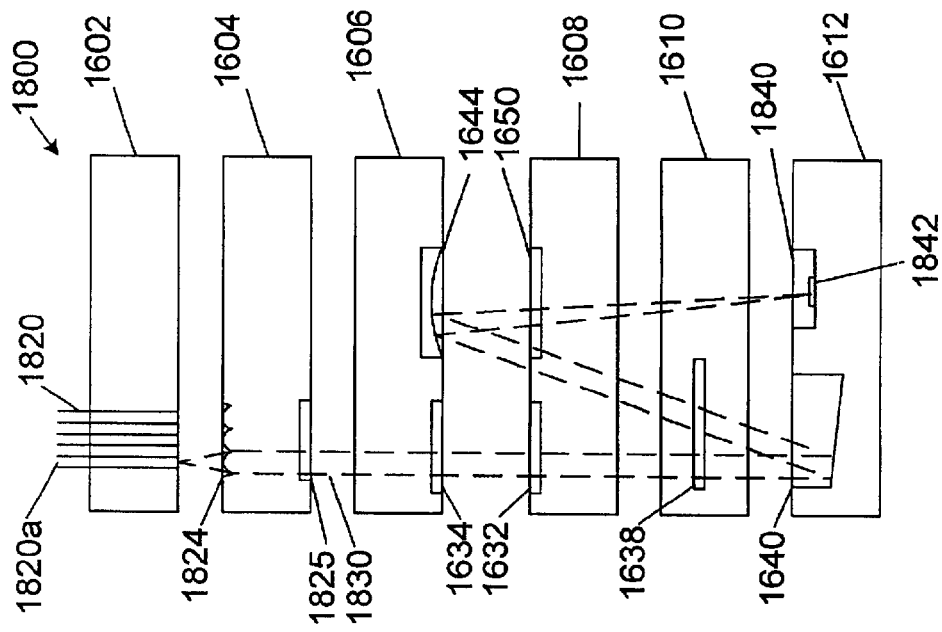
FIGS. 18A–18D schematically illustrate an embodiment of an optical add/drop multiplexer that uses a transmissive diffractive optical element according to the present invention.
Figure 18B:
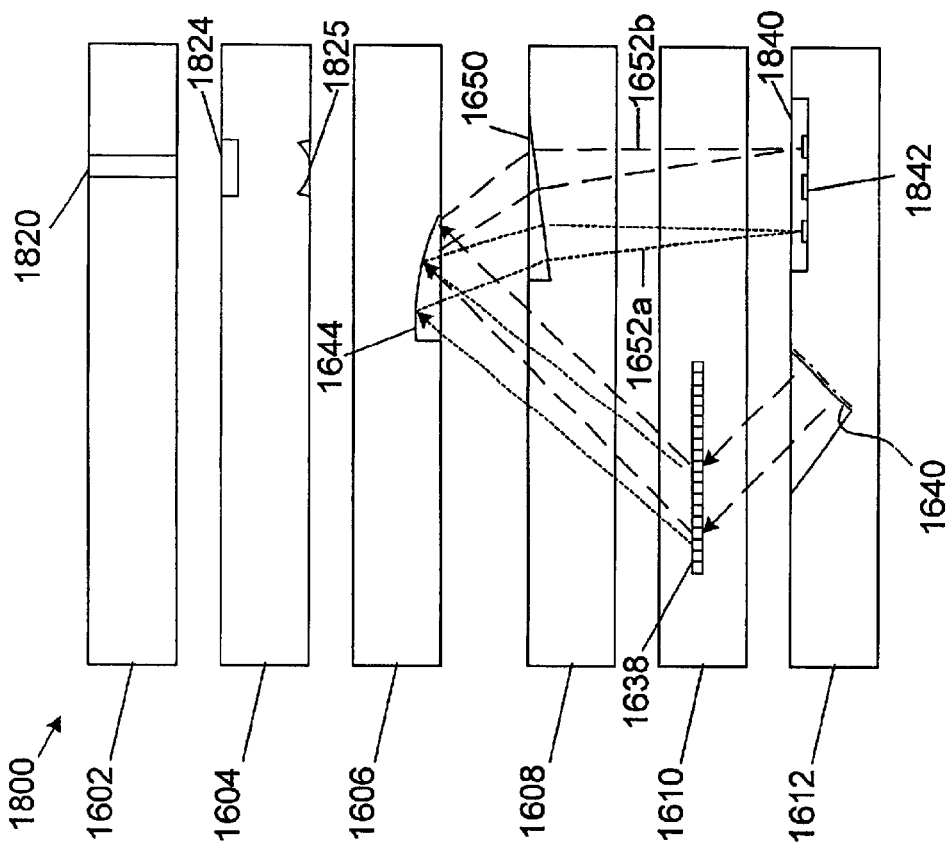

Another embodiment of device 1800, that operates as an optical add/drop multiplexer (C)ADM), is schematically illustrated in FIGS. 18A and 18B. Rather than holding a single input fiber, the first optical sheet 1602 includes a number of channels to receive multiple fibers 1820. An array of lenses 1824 and/or 1825, on the second optical sheet 1604, is provided to collimate light from, and focus light to, each of the fibers 1820.

Assume that light 1830 passes from the first fiber 1820*a* to the angled reflector 1640, through the transmissive diffracting element 1638, in a manner similar to that illustrated in FIG. 16A. The light is then reflected from the angled reflector 1640, as illustrated in both FIGS. 18A and 18B, back through the transmissive diffracting element 1638, to a curved reflector 1644 that directs the light to a switch array 1840 disposed on the sixth optical sheet 1612. The switch array 1840 includes a number of optical switches 1842, each switch disposed arranged to operate on a separate channel of a DWDM signal. The switches 1842 may be reflective switches, for example mirror surfaces, whose orientation is controlled between at least two different positions. Thus each switch 1842 may independently be controlled to adjust the direction at which light is reflected off the switch 1842. In the illustrated embodiment, the switches are assumed to be two position switches, but it will be appreciated that switches having more positions may also be used.

Figure 18D:
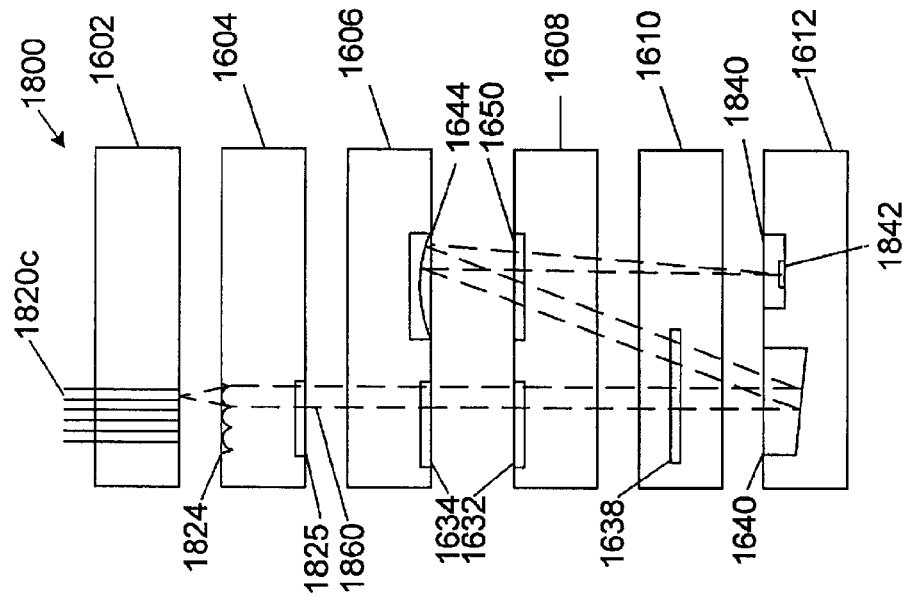
Figure 18C:
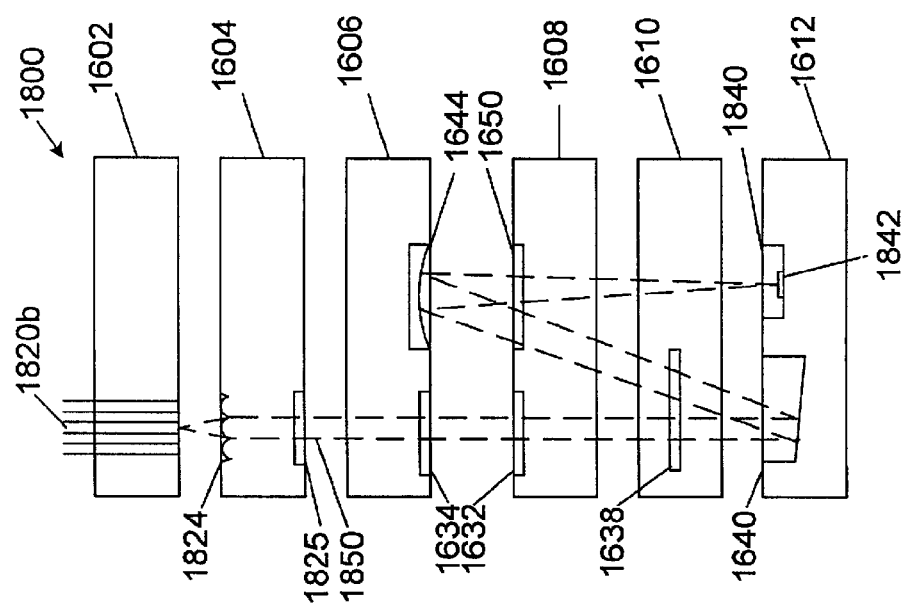

The reflection of light back through the device 1800 when a switch 1842 is in its first position is illustrated in FIG. 18C. The light passes from the switch 1842, back through the transmissive diffracting element 1638 to the angled reflector 1640. The light 1850 is reflected by the angled reflector 1640 through the transmissive diffracting element 1638 up to the second fiber 1820*b*.

Reflection of light through the device when a switch 1842 is in its second position is illustrated in FIG. 18D. The light passes from the switch 1842, back through the transmissive diffracting element 1638 to the angled reflector 1640. The light 1860 is reflected by the angled reflector 1640 through the transmissive diffracting element 1638 up to the third fiber 1820*c*.

Therefore, selective activation of each of the switches 1842 in the switch array 1840 permits control of whether certain wavelengths of the light 1830 entering the device 1800 are passed to the second fiber 1820*b* or the third fiber 1820*c*. Thus, the device may be operated as a drop filter.

It will be appreciated that when light enters the device through the fibers 1820*b* and 1820*c*, selective activation of the switches 1842 may allow the device 1800 to add channels to a signal that is directed out of the device 1800 through fiber 1820*a*, in which case the device 1800 may be operated as an add filter.

The use of optical switches in a spectrometer-based OADM is described in greater detail in U.S. patent application Ser. No. 09/790,144, incorporated herein by reference. The optical switches 1842 may have more positions than the two positions illustrated in FIGS. 18A–18D. In another embodiment, the optical switches 1842 may switch between reflective and transmissive states, in which case the light may be reflected between first and second fibers 1820*a* and 1820*b*, or be transmitted through the sixth optical sheet 1612 to one or more fibers.

FIGS. 16–18 show different configurations of a SPIO transmissive diffracting element being used as a MUX/DMUX, a wavelength monitor and an OADM. It will be appreciated that other types of SPIO spectrometer, for example the embodiments of spectrometer illustrated in FIGS. 4A–4C may also be employed as DWDM devices, for example by adding a fiber array to replace the detector 408, in which case the device operates as a MUX/DMUX. Furthermore, the detector 408, or the array of fibers 1406 in the embodiments illustrated in FIGS. 14 and 15, may be replaced by optical switches so that the devices 400, 440, 460,1400, or 1500, operate as OADMs.

EXAMPLE

In an example of optical sheets formed using the techniques discussed above, an aluminum 2011 base was machined with mounting portions for several different types of optical elements parts. The aluminum was gold plated, and then the optical element parts mounted on the base. The optical element parts included three dimensional elements, such as lenses and prisms, and two dimensional elements, including glass sheets with gratings having a period of around 1 $\mu$m and a depth around 0.5 $\mu$m. The optical element parts were attached to the base using with Loctite 358 UV curing glue.

A conductive coating was applied over the base and the mounted optical element parts using sputter deposition. The conductive coating included a 1000 nm thick layer of nickel, followed by a 200 nm thick layer of gold. A layer of nickel, 50 $\mu$m thick, was electrodeposited on the conductively coated base using a nickel chloride electrodeposition process. A layers of copper, 4 mm thick, was then electrodeposited over the nickel layer. The electrodeposited metal was leveled by milling while still attached to the aluminum base.

The aluminum base was removed by etching in 1.5 M NaOH at approx. 50° C. for two days. The electroplated gold was removed by selective etching, to produce a nickel-copper shim having a diameter of 100 mm. Two rectangular replications tools, each having dimensions 60 mm×30 mm×2 mm were obtained by milling the nickel-copper shim. One of the replication tools was used to replicate optical sheets using a hot embossing process, in a hot embossing system manufactured by Jenoptik Mikrotechnik (Germany). The hot embossing was performed on sheet-formed thermoplastics, having dimensions of around 100 mm×100 mm×5 mm. The thermoplastics used for hot embossing included cyclo-olefin copolymer, polycarbonate and polymethylmethacrylate.

Optical microscopy of the tool and the replicated sheets qualitatively verified that both the three dimensional refractive elements, having a depth of up to approximately 1 mm, and the two dimensional diffractive structures were successfully transferred from the conductively coated base to the replication tool, and from the replication tool to the optical sheets.

Figure 19:
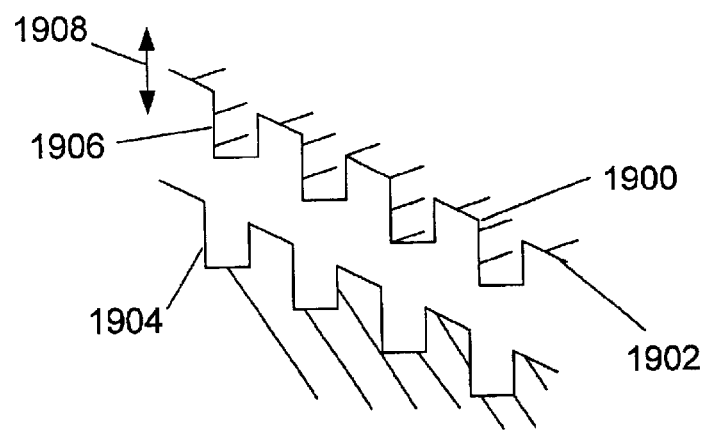
FIG. 19 schematically represents an embodiment of a replication tool fabricating an angled diffractive element, according to an embodiment of the present invention.

Although the embodiments of transmissive and reflective diffracting elements disclosed herein are shown to be parallel to the optical sheets on which they are mounted, this need not be the case. A diffracting element may be positioned at an angle relative to the optical sheet upon which it is mounted. For example, a diffractive element may be placed on a surface that is replicated at an angle. Also, a diffractive element at an angle may be replicated directly, so long as the micro-profile of the angled diffractive element enables release of the replication tool by vertical movement. For example, as illustrated in FIG. 19, a replication tool 1900 may have a replicating surface 1902 that is designed for replicating an angled diffracting element 1904. The tool 1900 has microstructures 1906 that are oriented in the direction in which the tool is released, illustrated by the arrow 1908, rather than being oriented at right angles to the angled surface 1902.

As noted above, the present invention is applicable to replicating optical devices on optical sheets. The process of making a replication tool described herein is advantageous in that it permits optical elements having low features (<10 $\mu$m in height) to be combined with optical elements having large features (<~100 $\mu$m or more in height) on the same surface. Such a combination may be achieved using only one replication tool. In addition, the method of forming a replication tool is less expensive than a precise cutting technique such as diamond turning.

The present invention is believed to be particularly useful for manufacturing many different types of optical circuits, including different types of sensors, including proximity sensors, color sensors and the like, and different types of optical circuits useful in DWDM communications, including MUX/DMUX, monitors, and OADMs. The. present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

For example, the devices described herein may be formed from different numbers of sheets and different numbers of elements. In illustration, the spectrometer-based device illustrated in FIGS. 16A–18D may be formed from a number of different optical sheets, and need not be restricted to using only six or seven sheets. The transmissive diffracting element 1638 may, for example, be provided on the lower surface of the fourth sheet 1608, rather than on a sheet of its own. Also, spacers, either separate or integral may be provided in any of the embodiments described herein to obtain a desired separation distance between particular optical elements.

We claim:

1. An optical system, comprising:
   a stack of at least two optical sheets, at least one of the optical sheets including a surface replicated with both a micro-structured optical element and at least one three-dimensional optical element;
   wherein the three-dimensional optical element has a vertical dimension of at least 100 $\mu$m relative to a replication base surface.

2. A system as recited in claim 1, wherein the replicated micro-structured optical element has a feature height of less than 10 $\mu$m.

3. A system as recited in claim 1, wherein the replicated micro-structured optical element is a transmissive diffractive optical element.

4. A system as recited in claim 1, wherein the replicated micro-structured optical element is a reflective, diffractive optical element.

5. A system as recited in claim 1, wherein the three-dimensional optical element has a vertical dimension of at least 500 $\mu$m relative to a base surface.

6. A system as recited in claim 1, wherein the three-dimensional optical element has a vertical dimension of at least 1 mm relative to a base surface.

7. A system as recited in claim 1, wherein at least one of the optical sheets includes a first surface replicated with at least a first optical element and a second surface replicated with at least a second optical element.

8. A system as recited in claim 1, further comprising one or more spacers interposed within the stack of at least two optical sheets.

9. A system as recited in claim 1, wherein at least one of the optical sheets includes an integrated spacer.

10. A system as recited in claim 1, wherein an optical path within the stack passes from a first optical element on a first optical sheet to a first optical element on a second optical sheet and to a second optical element on the first optical sheet.

11. A system as recited in claim 10, wherein the first and second elements on the first optical sheet are on a first surface of the first optical sheet.

12. A system as recited in claim 1, further comprising at least one active optical element disposed on one of the optical sheets.

13. A system as recited in claim 1, further comprising at least one passive optical element attached to a surface of one of the optical sheets.

14. An optical system, comprising:
a plurality of stacked optical sheets, each of the stacked optical sheets including at least one optical element replicated on a surface,
wherein an optical path within the plurality of stacked sheets passe from a first optical element on a first optical sheet of the plurality of stacked optical sheets to a first optical element on a second optical sheet of the plurality of stacked optical sheets and from the first optical element on the second optical sheet to a second optical element on the first optical sheet.

15. A system as recited in claim 14, wherein the optical path further passes from the second optical element on the first optical sheet to a second optical element on the second optical sheet.

16. A system as recited in claim 14, wherein the first and second optical elements on the first optical sheet are on a first surface of the first optical sheet.

17. An system as recited in claim 14, wherein the first and second optical elements on the first optical sheet are respectively on first and second surfaces of the first optical sheet.

18. An system as recited in claim 14, wherein one of the optical sheets includes a surface replicated with a micro-structured optical element.

19. An system as recited in claim 18, wherein the micro-structured optical element is a reflective diffractive optical element.

20. An system as recited in claim 18, wherein the micro-structured optical element is a transmissive diffractive optical element.

21. A system as recited in claim 14, further comprising one or more spacers interposed within the plurality of stacked optical sheets.

22. A system as recited in claim 14, wherein one of the optical sheets defines a sheet plane and has a surface replicated with an optical element having a dimension of at least 100 $\mu$m in a direction perpendicular to the sheet plane.

23. A system as recited in claim 14, wherein one of the optical sheets defines a sheet plane and has a surface replicated with an optical element having a dimension of at least 500 $\mu$m in a direction perpendicular to the sheet plane.

24. A system as recited in claim 14, wherein one of the optical sheets defines a sheet plane and has a surface replicated with an optical element having a dimension of at least 1 mm in a direction perpendicular to the sheet plane.

25. A system as recited in claim 14, wherein at least one of the optical sheets includes an integrated spacer.

26. An optical system, comprising:
a plurality of stacked optical sheets, each of the stacked optical sheets including at least one optical element replicated on a surface.
wherein an optical path within the plurality of stacked sheets passes from a first optical element on a first optical sheet of the plurality of stacked optical sheets to a first optical element on a second optical sheet of the plurality of stacked optical sheets, and from the first optical element on the second optical sheet to a second optical element on the first optical sheet without substantially entering the second optical sheet proximate the first optical element on the second optical sheet.

27. A system as recited in claim 26, wherein the optical path further passes from the second optical element on the first optical sheet to a second optical element on the second optical sheet.

28. A system as recited in claim 26, wherein the first and second optical elements on the first optical sheet are on a first surface of the first optical sheet.

29. An system as recited in claim 26, wherein the first and second optical elements on the first optical sheet are respectively on first and second surfaces of the first optical sheet.

30. An system as recited in claim 26, wherein the first optical element on the second optical sheet is a surface-replicated micro-structured optical element.

31. An system as recited in claim 30, wherein the micro-structured optical element is a reflective diffractive optical element.

32. A system as recited in claim 26, wherein the second optical element on the first optical sheet is a surface-replicated optical element having a dimension of at least 100 $\mu$m in a direction perpendicular to the first optical sheet.

33. A system as recited in claim 26, wherein the second optical element on the first optical sheet is a surface-replicated optical element having a dimension of at least 500 $\mu$m in a direction perpendicular to the first optical sheet.

34. A system as recited in claim 26, wherein the second optical element on the first optical sheet is a surface-replicated optical element having a dimension of at least 1 mm in a direction perpendicular to the first optical sheet.

35. An system as recited in claim 26, wherein:
the first optical element on the second optical sheet is a surface-replicated micro-structured optical element; and
the second optical element on the first optical sheet is a surface-replicated optical element having a dimension of at least 100 $\mu$m in a direction perpendicular to the first optical sheet.

36. A system as recited in claim 26, further comprising one or more spacers interposed within the plurality of stacked optical sheets.

37. A system as recited in claim 26, wherein at least one of the optical sheets includes an integrated spacer.

* * * * *